(12) United States Patent
Gao et al.

(10) Patent No.: US 12,081,433 B2
(45) Date of Patent: Sep. 3, 2024

(54) METHOD, NETWORK DEVICE, AND SYSTEM FOR CONTROLLING PACKET SENDING

(71) Applicant: Huawei Technologies Co., Ltd., Guangdong (CN)

(72) Inventors: Qiangzhou Gao, Beijing (CN); Gang Yan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/173,678

(22) Filed: Feb. 23, 2023

(65) Prior Publication Data

US 2023/0198897 A1 Jun. 22, 2023

Related U.S. Application Data

(63) Continuation of application No. PCT/CN2021/113146, filed on Aug. 18, 2021.

(30) Foreign Application Priority Data

Aug. 26, 2020 (CN) .......................... 202010867038.4
Nov. 13, 2020 (CN) .......................... 202011268521.7

(51) Int. Cl.
*H04L 45/00* (2022.01)
*H04L 45/12* (2022.01)
*H04L 45/42* (2022.01)

(52) U.S. Cl.
CPC ............ *H04L 45/42* (2013.01); *H04L 45/123* (2013.01)

(58) Field of Classification Search
None
See application file for complete search history.

(56) References Cited

U.S. PATENT DOCUMENTS

| 9,838,246 B1* | 12/2017 | Hegde ..................... H04L 45/18 |
| 2011/0069713 A1* | 3/2011 | Mariblanca Nieves ..................... H04L 45/02 370/400 |

(Continued)

FOREIGN PATENT DOCUMENTS

| CN | 109561356 A | 4/2019 |
| CN | 110351198 A | 10/2019 |

(Continued)

OTHER PUBLICATIONS

B. Decraene et al., "IS-IS Flooding Parameters advertisement draft-decraene-lsr-isis-flooding-speed-04", Jun. 10, 2020, total.

(Continued)

*Primary Examiner* — Christopher B Robinson
(74) *Attorney, Agent, or Firm* — WOMBLE BOND DICKINSON (US) LLP

(57) ABSTRACT

This application discloses a method, device, and system for controlling packet sending, to control sending of a link state advertisement packet. The method includes: obtaining a first quantity of link state advertisement packets sent by a transmitting end device to a receiving end device in a first time period, obtaining a second quantity of link state advertisement packets received by the receiving end device from the transmitting end device in a second time period, adjusting a link state advertisement packet receive window value of the receiving end device based on the first quantity and the second quantity, and sending an adjusted link state advertisement packet receive window value to the transmitting end device.

19 Claims, 11 Drawing Sheets

(56) References Cited

U.S. PATENT DOCUMENTS

| | | | |
|---|---|---|---|
| 2011/0103228 A1* | 5/2011 | Sheth | H04L 45/02 |
| | | | 370/238 |
| 2012/0170486 A1* | 7/2012 | Mohapatra | H04L 45/025 |
| | | | 370/254 |
| 2017/0070444 A1 | 3/2017 | Dhanabalan et al. | |
| 2017/0171058 A1* | 6/2017 | Wang | H04L 41/12 |
| 2019/0356578 A1* | 11/2019 | Gao | H04L 45/20 |
| 2020/0127918 A1* | 4/2020 | Bhat | H04L 45/121 |

FOREIGN PATENT DOCUMENTS

| | | | | |
|---|---|---|---|---|
| WO | WO-2018113586 A1 * | 6/2018 | | H04L 45/02 |
| WO | 2019210725 A1 | 11/2019 | | |

OTHER PUBLICATIONS

T.Li, Ed et al.,"Dynamic Flooding on Dense Graphs draft ietf lsr dynamic flooding 07",Jun. 23. 2020, total:47pages.

\* cited by examiner

METHOD, NETWORK DEVICE, AND SYSTEM FOR CONTROLLING PACKET SENDING

CROSS-REFERENCE TO RELATED APPLICATIONS

This application is a continuation of International Application No. PCT/CN2021/113146, filed on Aug. 18, 2021, which claims priority to Chinese Patent Application No. 202011268521.7, filed on Nov. 13, 2020, which claims priority to Chinese Patent Application No. 202010867038.4, filed on Aug. 26, 2020. All of the aforementioned patent applications are hereby incorporated by reference in their entireties.

TECHNICAL FIELD

The present disclosure relates to the communication field, and in particular, to a method, network device, and system for controlling packet sending.

BACKGROUND

In networks running link-state routing protocols, each router stores a database for describing a topology structure of an area in which the router is located. This database is referred to as a link state database. All participating routers have a same database. Each entry in the database includes a status of a specific router (such as an available interface of the router and a reachable neighbor). The link-state routing protocols include an open shortest path first (OSPF) protocol and an intermediate system to intermediate system (IS-IS) protocol.

The router advertises the status of the router to the entire area in a flooding manner. IS-IS is used as an example. A sender sends a link state protocol (LSP) in a link state database of the sender to all neighbors through an LSP data unit packet. After receiving the LSP, the neighbors (receivers) returns a partial sequence number protocol data unit (PSNP) for acknowledgment. If no acknowledgment packet is received within a specified time period, the sender retransmits the LSP packet. In some network scenarios, if a receiver is connected to a plurality of senders, the plurality of senders all send LSP packets to the receiver. If the receiver cannot handle these LSP packets in a timely manner, these senders retransmit a large quantity of packets, wasting network resources and affecting timely synchronization of non-retransmitted LSP packets.

SUMMARY

Embodiments of this application provide a packet sending method, a network node, and a system, to improve flexibility of transmitting a link state advertisement packet and reduce a waste of network resources.

According to a first aspect, an embodiment of this application provides a method for controlling packet sending. In the method, a first network device obtains a first quantity of link state advertisement packets sent by a second network device to the first network device in a first time period. The first network device obtains a second quantity of link state advertisement packets received from the second network device in a second time period corresponding to the first time period. The first network device adjusts a link state advertisement packet receive window value of the first network device based on the first quantity and the second quantity, and the first network device sends an adjusted link state advertisement packet receive window value to the second network device. According to the foregoing technical solution, the first network device adjusts the link state advertisement packet receive window value of the first network device based on the first quantity and the second quantity, and then sends the adjusted window value to the second network device. In this way, the second network device can flexibly adjust, based on the adjusted window value, a rate at which a link state advertisement packet is sent to the first network device, to improve flexibility of transmitting the link state advertisement packet and reduce a waste of network resources to some extent.

In an embodiment, that a first network device obtains a first quantity of link state advertisement packets sent by a second network device to the first network device in a first time period includes: The first network device receives a first advertisement packet sent by the second network device, where the first advertisement packet includes a third quantity of link state advertisement packets that have been sent by the second network device to the first network device when the first advertisement packet is sent. The first network device receives a second advertisement packet sent by the second network device, where the second advertisement packet includes a fourth quantity of link state advertisement packets that have been sent by the second network device to the first network device when the second advertisement packet is sent. The first network device obtains the first quantity, where the first quantity is equal to a difference between the fourth quantity and the third quantity. The second network device sends two advertisement packets to the first network device in the first time period, each advertisement packet includes a quantity of link state advertisement packets that have been sent by the second network device to the first network device when the packet is sent. In this way, the first network device may obtain, based on the two advertisement packets, a quantity of link state advertisement packets that are sent by the second network device to the first network device in the first time period. In an embodiment, each of the two advertisement packets includes an indication identifier indicating that the advertisement packet carries a quantity of link state advertisement packets sent by the second network device to the first network device. In an embodiment, the third quantity and the fourth quantity are quantities counted by a routing protocol processing module of the second network device.

In an embodiment, that the first network device obtains a second quantity of link state advertisement packets received from the second network device in a second time period includes: The first network device obtains a fifth quantity of link state advertisement packets that have been received from the second network device when the first advertisement packet is received. The first network device obtains a sixth quantity of link state advertisement packets that have been received from the second network device when the second advertisement packet is received, where the second quantity is equal to a difference between the sixth quantity and the fifth quantity. In an embodiment, the first advertisement packet and the second advertisement packet each include one piece of indication information indicating the first network device to record, when receiving the advertisement packet, a quantity of link state advertisement packets that have been received from the second network device.

In an embodiment, that a first network device obtains a first quantity of link state advertisement packets sent by a second network device to the first network device in a first time period includes: The first network device receives a third advertisement packet sent by the second network device, where the third advertisement packet includes the first quantity. In an embodiment, the first time period is a time period from a time point at which the second network device establishes a connection or a session to the first network device to a time point at which the third advertisement packet is sent. The second time period is a time period from a time point at which the first network device establishes a connection or a session to the second network device to a time point at which the third advertisement packet is received. In an embodiment, the first time period is specific duration before the second network device sends the third advertisement packet to the first network device. The second time period is specific duration before the first network device receives the third advertisement packet from the second network device. In an embodiment, the third advertisement packet further includes the specific duration.

In an embodiment, the third advertisement packet further includes the specific duration, and the method further includes:

The first network device obtains the second quantity based on the specific duration, where the second quantity is a quantity of link state advertisement packets received from the second network device within the specific duration before the first network device receives the third advertisement packet.

In an embodiment, the third advertisement packet further includes a start time point and an end time point of the first time period, and the method further includes:

The first network device obtains the second quantity based on the start time point and the end time point of the first time period. In an embodiment, the first network device may count a quantity of link state advertisement packets received from the second network device from the start time point to the end time point.

In an embodiment, the third advertisement packet may further include a start time point and an end time point of the second time period, and the method further includes: The first network device obtains the second quantity based on the start time point and the end time point of the second time period.

In an embodiment, duration of the first time period is the same as or different from duration of the second time period.

In an embodiment, that the first network device adjusts a link state advertisement packet receive window value based on the first quantity and the second quantity includes: when determining that a difference between the first quantity and the second quantity is greater than a threshold, decreasing the link state advertisement packet receive window value of the first network device by a specific value, where the link state advertisement packet receive window value decreased by the specific value is the adjusted link state advertisement packet receive window value. Decreasing the link state advertisement packet receive window value by the specific value may trigger the second network device to enter a rate limiting mode more quickly. That is, before the link state advertisement packet receive window value is decreased by the specific value, the second network device can be triggered to limit the rate at which the link state advertisement packet is sent to the first network device more quickly. In this way, when network congestion occurs, the sending rate of the link state advertisement packet is reduced, further network congestion is avoided, and retransmission of the link state advertisement packet is reduced, thereby reducing a waste of network resources.

In an embodiment, that the first network device adjusts a link state advertisement packet receive window value based on the first quantity and the second quantity includes: when determining that a difference between the first quantity and the second quantity is less than or equal to a threshold, increasing the link state advertisement packet receive window value of the first network device by a specific value, where the link state advertisement packet receive window value increased by the specific value is the adjusted link state advertisement packet receive window value. Increasing the link state advertisement packet receive window value by the specific value may enable the second network device to avoid entering a rate limiting mode or enter the rate limiting mode more slowly. In this way, the rate at which the second network device sends the link state advertisement packet to the first network device is also increased to some extent. In this way, when a network is idle, the sending rate of the link state advertisement packet can be increased, thereby using network resources more effectively.

In an embodiment, that the first network device adjusts a link state advertisement packet receive window value based on the first quantity and the second quantity includes: when determining that a difference between the first quantity and the second quantity is greater than a threshold, increasing the link state advertisement packet receive window value of the first network device by a specific value, where the link state advertisement packet receive window value increased by the specific value is the adjusted link state advertisement packet receive window value.

In an embodiment, that the first network device adjusts a link state advertisement packet receive window value based on the first quantity and the second quantity includes:

when determining that a difference between the first quantity and the second quantity is less than or equal to a threshold, decreasing the link state advertisement packet receive window value of the first network device by a specific value, and using the link state advertisement packet receive window value decreased by the specific value as the adjusted link state advertisement packet receive window value.

In an embodiment, the second quantity is a quantity, counted by the routing protocol processing module of the first network device, of link state advertisement packets received from the second network device.

In an embodiment, the first quantity is a quantity, counted by the routing protocol processing module of the second network device, of link state advertisement packets sent to the first network device.

In an embodiment, the routing protocol processing module includes an OSPF module or an IS-IS module.

In an embodiment, each of the first advertisement packet and the second advertisement packet is an OSPF packet, or each of the first advertisement packet and the second advertisement packet is an IS-IS packet.

In an embodiment, the first network device and the second network device are connected in a point-to-point manner.

In an embodiment, the first network device is connected to a second interface of the second network device through a first interface, the first quantity is a quantity of link state advertisement packets sent by the second network device to the first network device through the second interface, and the second quantity is a quantity of link state advertisement packets received by the first network device from the second network device through the first interface.

In an embodiment, the link state advertisement packet receive window value of the first network device is a threshold related to a quantity of link state advertisement packets that are received by the first network device and for which no response packet is returned.

In an embodiment, the link state advertisement packet receive window value of the first network device is a maximum value of a quantity of link state advertisement packets that are received by the first network device and for which no response packet is returned.

In an embodiment, the first network device sends the adjusted link state advertisement packet receive window value to the second network device through a fourth advertisement packet, where an interface link state protocol data unit receive window sub type length value (InterfaceLSPReceiveWindow sub-TLV) of the fourth advertisement packet includes the adjusted link state advertisement packet receive window value.

In an embodiment, priorities of the first advertisement packet and the second advertisement packet are respectively the same as priorities of link state advertisement packets. The priorities of the first advertisement packet and the second advertisement packet are respectively set to be the same as the priorities of the link state advertisement packets, to avoid disorder between the two advertisement packets and the two state advertisement packets in a forwarding process, and improve accuracy of calculating the first quantity and the second quantity.

In an embodiment, the first advertisement packet and the second advertisement packet may be link state advertisement packets.

In an embodiment, the second quantity is a quantity, counted by a packet receiving module of the first network device, of link state advertisement packets received from the second network device.

In an embodiment, the first quantity is a quantity, counted by a packet sending module of the second network device, of link state advertisement packets sent to the first network device.

According to a second aspect, an embodiment of this application provides a method for controlling packet sending. In the method, a second network device receives a link state advertisement packet receive window value of a first network device sent by the first network device, where the link state advertisement packet receive window value of the first network device is a link state advertisement packet receive window value adjusted by the first network device based on a first quantity and a second quantity, the first quantity is a quantity of link state advertisement packets sent by the second network device to the first network device in a first time period, the second quantity is a quantity of link state advertisement packets received by the first network device from the second network device in a second time period, and the second time period corresponds to the first time period. The second network device adjusts, based on the link state advertisement packet receive window value of the first network device, a rate at which a link state advertisement packet is sent to the first network device. The second network device receives the adjusted link state advertisement packet receive window value of the first network device, and then adjusts, based on the link state advertisement packet receive window value, the rate at which the link state advertisement packet is sent to the first network device, to improve flexibility of transmitting the link state advertisement packet, and reduce a waste of network resources to some extent.

In an embodiment, the second network device sends a first advertisement packet to the first network device, where the first advertisement packet includes a third quantity of link state advertisement packets that have been sent by the second network device to the first network device when the first advertisement packet is sent. The second network device sends a second advertisement packet to the first network device, where the second advertisement packet includes a fourth quantity of link state advertisement packets that have been sent by the second network device to the first network device when the second advertisement packet is sent, and the first quantity is equal to a difference between the fourth quantity and the third quantity.

In an embodiment, the second network device sends a third advertisement packet to the first network device, where the third advertisement packet includes the first quantity.

In an embodiment, that the second network device adjusts, based on the link state advertisement packet receive window value, a rate at which a link state advertisement packet is sent to the first network device includes: The second network device adjusts, based on the link state advertisement packet receive window value, a time interval at which the link state advertisement packet is sent to the first network device.

In an embodiment, that the second network device adjusts, based on the link state advertisement packet receive window value, a time interval at which the link state advertisement packet is sent to the first network device includes: When determining that a quantity of link state advertisement packets that are sent to the first network device and for which no response packet is received reaches the link state advertisement packet receive window value, the second network device adjusts the time interval at which the second network device sends the link state advertisement packet to the first network device to a specific value.

In an embodiment, the second network device receives a fourth advertisement packet sent by the first network device, where the fourth advertisement packet includes the link state advertisement packet receive window value and a link state advertisement packet transmission time interval value, and the specific value is greater than or equal to the link state advertisement packet transmission time interval. In an embodiment, the link state advertisement packet transmission time interval is preconfigured on the second network device, or a controller in a network sends the link state advertisement packet transmission time interval to the second network device.

A quantity of link state advertisement packets sent by the second network device to the first network device is a quantity, counted by a routing protocol processing module of the second network device, of link state advertisement packets sent to the first network device, and the routing protocol processing module includes an OSPF module or an IS-IS module.

According to a third aspect, an embodiment of this application provides a method for controlling packet sending. In the method, a second network device obtains a first quantity of link state advertisement packets sent by the second network device to a first network device in a first time period, and the second network device obtains a second quantity of link state advertisement packets received by the first network device from the second network device in a second time period, where the second time period corresponds to the first time period. The second network device adjusts, based on the first quantity and the second quantity, a rate at which the second network device sends a link state advertisement packet to the first network device. According to the foregoing technical solution, the second network device adjusts, based on the first quantity and the second quantity, the rate at which the link state advertisement packet is sent to the first network device, so that the rate at which the link state advertisement packet is sent can be flexibly controlled based on a network congestion status, to improve flexibility of transmitting the link state advertisement packet, and reduce a waste of network resources to some extent.

In an embodiment, the second network device sends a first advertisement packet to the first network device, and records a third quantity of link state advertisement packets that have been sent to the first network device when the first advertisement packet is sent. The second network device sends a second advertisement packet to the first network device, and records a fourth quantity of link state advertisement packets that have been sent to the first network device when the second advertisement packet is sent, where the first quantity is equal to a difference between the fourth quantity and the third quantity.

In an embodiment, the first time period is a time interval between time points at which the second network device sends the second advertisement packet and the first advertisement packet to the first network device, and the second time period is a time interval between time points at which the first network device receives the second advertisement packet and the first advertisement packet from the second network device.

In an embodiment, that the second network device obtains a second quantity of link state advertisement packets received by the first network device from the second network device in a second time period includes:

The second network device receives the second quantity sent by the first network device, where the second quantity is a quantity of link state advertisement packets received by the first network device from the second network device within the time interval between the time points at which the first network device receives the first advertisement packet and the second advertisement packet.

In an embodiment, the adjusting, based on the first quantity and the second quantity, a rate at which the second network device sends a link state advertisement packet to the first network device includes: adjusting, based on the first quantity and the second quantity, a time interval at which the second network device sends the link state advertisement packet to the first network device.

In an embodiment, the adjusting, based on the first quantity and the second quantity, a time interval at which the second network device sends the link state advertisement packet to the first network device includes: when the second network device determines that a difference between the first quantity and the second quantity is greater than a threshold, increasing, by a specific value, the time interval at which the second network device sends the link state advertisement packet to the first network device. When the second network device determines that the difference between the first quantity and the second quantity is greater than the threshold, the second network device directly increases the time interval at which the link state advertisement packet is sent to the first network device, so that the second network device can directly enter a rate limiting mode, thereby avoiding further network congestion.

In an embodiment, the adjusting, by the second network device based on the first quantity and the second quantity, a time interval at which the second network device sends the link state advertisement packet to the first network device includes: when the second network device determines that a difference between the first quantity and the second quantity is less than or equal to a threshold, decreasing, by a specific value, the time interval at which the second network device sends the link state advertisement packet to the first network device. When determining that the difference between the first quantity and the second quantity is less than or equal to the specific threshold, the first network device determines that a network status is good and no congestion occurs. The second network device directly decreases the time interval at which the link state advertisement packet is sent to the first network device, so that the rate at which the second network device sends the link state advertisement packet to the first network device can be increased, thereby using network resources more effectively.

In an embodiment, the adjusting, based on the first quantity and the second quantity, the rate at which the second network device sends the link state advertisement packet to the first network device includes: adjusting, based on the first quantity and the second quantity, a link state advertisement packet receive window value corresponding to the first network device.

In an embodiment, the adjusting, based on the first quantity and the second quantity, a link state advertisement packet receive window value corresponding to the first network device includes: when determining that a difference between the first quantity and the second quantity is greater than a threshold, decreasing the link state advertisement packet receive window value corresponding to the first network device by a specific value. When the second network device determines that the difference between the first quantity and the second quantity is greater than the threshold, the second network device decreases the link state advertisement packet receive window value corresponding to the first network device by the specific value, to trigger the second network device to enter a rate limiting mode more quickly, and can more quickly limit the rate at which the link state advertisement packet is sent to the first network device. In this way, when network congestion occurs, the sending rate of the link state advertisement packet is reduced, further network congestion is avoided, and retransmission of the link state advertisement packet is reduced, thereby reducing a waste of network resources.

In an embodiment, the adjusting, based on the first quantity and the second quantity, a link state advertisement packet receive window value corresponding to the first network device includes: when determining that a difference between the first quantity and the second quantity is less than or equal to a threshold, increasing the link state advertisement packet receive window value corresponding to the first network device by a specific value. Increasing the link state advertisement packet receive window value by the specific value may enable the second network device to avoid entering a rate limiting mode or enter the rate limiting mode more slowly. In this way, the rate at which the second network device sends the link state advertisement packet to the first network device is also increased to some extent. In this way, when a network is idle, the sending rate of the link state advertisement packet can be increased, thereby using network resources more effectively.

According to a fourth aspect, an embodiment of the present disclosure provides a method for controlling packet sending. In the method, a first network device obtains a first quantity of link state advertisement packets sent by a second network device to the first network device in a first time period. The first network device obtains a second quantity of link state advertisement packets received from the second network device in a second time period. The first network device adjusts, based on the first quantity and the second quantity, a rate at which the second network device sends a link state advertisement packet to the first network device. The first network device sends, to the second network device, an adjusted rate at which the second network device sends the link state advertisement packet to the first network device. The second network device sends the link state advertisement packet to the first network device based on the adjusted rate at which the link state advertisement packet is sent. According to this solution, the first network device can control, as soon as possible, the rate at which the second network device sends the link state advertisement packet to the first network device, to implement a method for flexibly controlling the link state packet, and use network resources more effectively.

According to a fifth aspect, an embodiment of the present disclosure provides a first network device, to perform the method in any one of the first aspect or the possible implementations of the first aspect. Specifically, the first network device includes a unit configured to perform the method in any one of the first aspect or the possible implementations of the first aspect.

According to a sixth aspect, an embodiment of the present disclosure provides a second network device, to perform the method in any one of the second aspect or the possible implementations of the second aspect. Specifically, the second network device includes a unit configured to perform the method in any one of the second aspect or the possible implementations of the second aspect.

According to a seventh aspect, an embodiment of the present disclosure provides a second network device, to perform the method in any one of the third aspect or the possible implementations of the third aspect. Specifically, the second network device includes a unit configured to perform the method in any one of the third aspect or the possible implementations of the third aspect.

According to an eighth aspect, an embodiment of the present disclosure provides a first network device, to perform the method in any one of the fourth aspect or the possible implementations of the fourth aspect. Specifically, the first network device includes a unit configured to perform the method in any one of the fourth aspect or the possible implementations of the fourth aspect.

According to a ninth aspect, a first network device is provided. The first network device includes a processor, a network interface, and a memory. The memory may be configured to store program code. The processor is configured to invoke the program code in the memory to perform the method in any one of the first aspect or the possible implementations of the first aspect. For details, refer to detailed descriptions in the method example. Details are not described herein again.

According to a tenth aspect, a second network device is provided. The second network device includes a processor, a network interface, and a memory. The memory may be configured to store program code. The processor is configured to invoke the program code in the memory to perform the method in any one of the second aspect or the possible implementations of the second aspect. For details, refer to detailed descriptions in the method example. Details are not described herein again.

According to an eleventh aspect, a second network device is provided. The second network device includes a processor, a network interface, and a memory. The memory may be configured to store program code. The processor is configured to invoke the program code in the memory to perform the method in any one of the third aspect or the possible implementations of the third aspect. For details, refer to detailed descriptions in the method example. Details are not described herein again.

According to a twelfth aspect, a first network device is provided. The first network device includes a processor, a network interface, and a memory. The memory may be configured to store program code. The processor is configured to invoke the program code in the memory to perform the method in any one of the fourth aspect or the possible implementations of the fourth aspect. For details, refer to detailed descriptions in the method example. Details are not described herein again.

According to a thirteenth aspect, a packet sending system is provided. The system includes the first network device and the second network device provided in the foregoing aspects.

According to a fourteenth aspect, a computer storage medium is provided, configured to store computer software instructions used by the foregoing network device. The computer storage medium includes a program designed for performing the foregoing aspects.

According to a fifteenth aspect, an embodiment of this application provides a computer program product including computer instructions. When the computer program product runs on a network device, the network device is enabled to perform the method provided in any one of the first aspect, the second aspect, the third aspect, the fourth aspect, the possible implementations of the first aspect, the possible implementations of the second aspect, the possible implementations of the third aspect, or the possible implementations of the fourth aspect.

According to a sixteenth aspect, an embodiment of this application provides a chip, including a memory and a processor, where the memory is configured to store instructions or program code, and the processor is configured to invoke the instructions or the program code from the memory and run the instructions or the program code to perform the method in any one of the first aspect or the possible implementations of the first aspect, the processor performs the method in any one of the second aspect or the possible implementations of the second aspect, the processor performs the method in any one of the third aspect or the possible implementations of the third aspect, or the processor performs the method in any one of the fourth aspect or the possible implementations of the fourth aspect.

In a possible design, the chip includes a processor. The processor is configured to read and execute the instructions or the program code stored in the memory. When the instructions or the program code is executed, the processor performs the method in any one of the first aspect or the possible implementations of the first aspect, the processor performs the method in any one of the second aspect or the possible implementations of the second aspect, the processor performs the method in any one of the third aspect or the possible implementations of the third aspect, or the processor performs the method in any one of the fourth aspect or the possible implementations of the fourth aspect.

DESCRIPTION OF EMBODIMENTS

The following describes embodiments of the present disclosure with reference to the accompanying drawings.

Before the specific technical solutions are described, key terms in embodiments of this application are first described.

A link state advertisement packet receive window value is a threshold related to a quantity of link state advertisement packets that are received by a receiving end of a link state advertisement packet and for which no response packet is returned.

Figure 1:
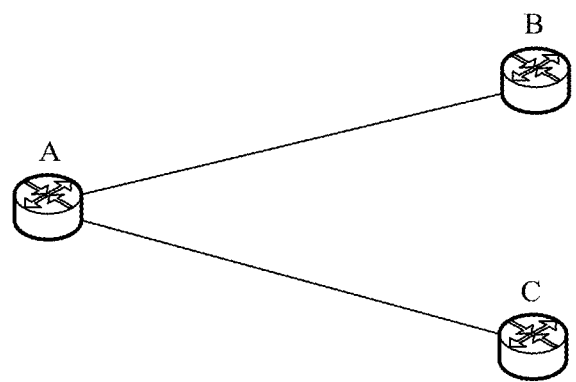
FIG. 1 is a schematic diagram of an application scenario of a method for controlling packet sending according to an embodiment of this application.

FIG. 1 is a schematic diagram of an application scenario of a method for controlling packet sending according to an embodiment of this application. As shown in FIG. 1, the scenario includes a network device A, a network device B, and a network device C. The network device A establishes a link-state routing protocol session to the network device B, and the network device A establishes a link-state routing protocol session to the network device C. A link-state routing protocol can be the IS-IS or the OSPF. When the network device B and the network device C separately send a link state advertisement packet to the network device A, the network device A serves as a receiving end device (a receiver), and the network device B and the network device C serve as transmitting end devices (senders). Because the network device B and the network device C each send the link state advertisement packet to the network device A, a rate at which the network device A processes the link state advertisement packet is reduced. Especially when a plurality of network devices send link state advertisement packets to the network device A at the same time, the network device A becomes a bottleneck, and the link state advertisement packet may not be processed in a timely manner and lost. Consequently, a routing entry for packet forwarding is not generated or deleted in a timely manner, and network reliability is reduced. The link state advertisement packet includes an IS-IS protocol LSP packet, an OSPF protocol link-state advertisement (LSA) packet, or a link state update (LSU) packet. The transmitting end device stores a counter to count a quantity of link state advertisement packets that are sent to the receiving end device and for which no corresponding response packet is received. For example, the network device B sends 100 link state advertisement packets to the network device A, the network device B sets the counter to 100, and each link state advertisement packet corresponds to one sequence number. After receiving a link state advertisement packet sent by the network device B, the network device A processes the link state packet, and sends a partial sequence number data packet (PSNP) to the network device B. The PSNP packet includes abstract information of the link state packet processed by the network device B, for example, includes an identifier (ID) and a sequence number of the link state packet. After receiving the PSNP packet, the network device A counts a quantity of IDs of link state packets included in the PSNP packet. Correspondingly, the network device B decreases the counter by the quantity of IDs of link state packets included in the PSNP packet. For example, if the PSNP includes 10 IDs of link state packets, the network device B decreases the counter by 10. If the network device B does not receive a response packet corresponding to a link state advertisement packet within a specified time period, the network device B retransmits the link state packet. Therefore, when the network device A needs to process too many link state advertisement packets, the network device A is overstocked with to-be-processed link state advertisement packets, which may also be understood as network congestion. The network device B and the network device C have a large quantity of retransmitted link state advertisement packets, which further aggravates congestion of the network device A, causes a great waste of network resources, and affects sending of a link state advertisement packet that does not need to be retransmitted. To avoid network congestion of the receiving end device, the receiving end device sets a link state advertisement packet receive window value, and the receiving end device sends the link state advertisement packet receive window value to the transmitting end device. When determining that a quantity of link state advertisement packets that have been sent and for which no response packet is received reaches the link state advertisement packet receive window value, the transmitting end device increases a time interval at which the link state advertisement packet is sent to the receiving end, thereby reducing further deterioration of congestion at the receiving end to some extent. However, generally, the link state advertisement packet receive window value is a fixed value, and cannot be dynamically adjusted based on an actual network status. As a result, control over transmission of the link state advertisement packet is inflexible, and network congestion cannot be effectively alleviated.

An embodiment of this application provides a method for controlling packet sending. In the method, a first network device obtains a first quantity of link state advertisement packets sent by a second network device to the first network device in a first time period, and obtains a second quantity of link state advertisement packets received by the first network device from the second network device in a second time period corresponding to the first time period. The first network device adjusts a link state advertisement packet receive window value of the first network device based on the first quantity and the second quantity. The first network device sends an adjusted link state advertisement packet receive window value to the second network device. Therefore, the link state advertisement packet receive window value is dynamically adjusted, transmission efficiency of the link state advertisement packet is improved, and a waste of network resources is reduced. The first network device may be referred to as a receiving end of the link state advertisement packet, or may be referred to as a receiving end device. The second network device may be referred to as a transmitting end of the link state advertisement packet, or may be referred to as a transmitting end device. The following describes in detail the method for controlling packet sending provided in embodiments of this application with reference to a specific flowchart.

Figure 2:
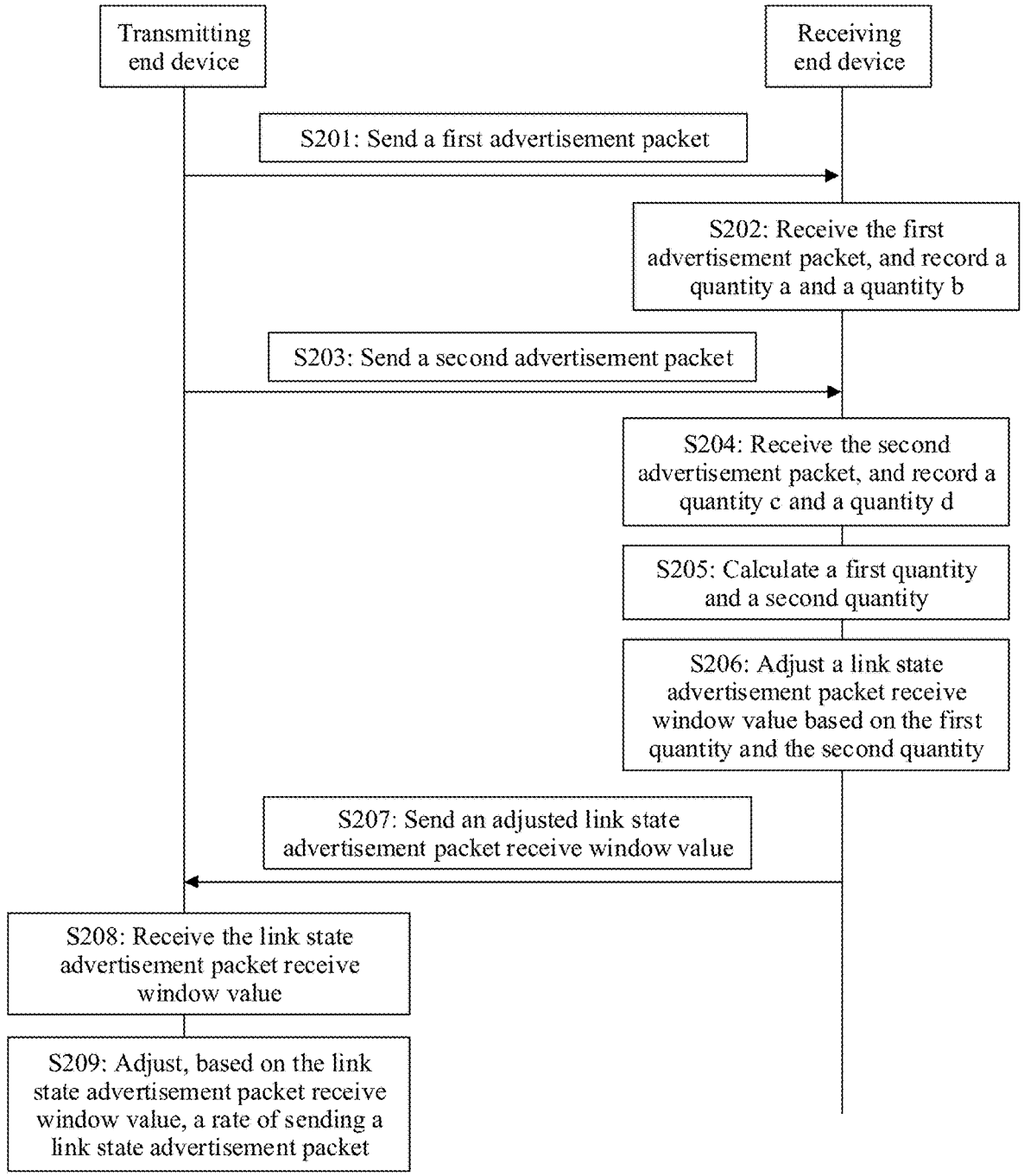
FIG. 2 is a schematic flowchart of a method for controlling packet sending according to an embodiment of this application.

Refer to FIG. 2. An embodiment of this application provides a method for controlling packet sending. The method includes the following operations.

S201: A transmitting end device sends a first advertisement packet to a receiving end device, where the first advertisement packet includes a quantity a of link state advertisement packets that have been sent by the transmitting end device to the receiving end device when the first advertisement packet is sent. The receiving end device may be the network device A in FIG. 1, and the transmitting end device may be the network device B or the network device C in FIG. 1.

S202: The receiving end device receives the first advertisement packet, records the quantity a, and records a quantity b of link state advertisement packets that have been received from the transmitting end device when the first advertisement packet is received.

S203: The transmitting end device sends a second advertisement packet to the receiving end device, where the second advertisement packet includes a quantity c of link state advertisement packets that have been sent by the transmitting end device to the receiving end device when the first advertisement packet is sent.

S204: The receiving end device receives the second advertisement packet, records the quantity c, and records a quantity d of link state advertisement packets that have been received from the transmitting end device when the second advertisement packet is received.

In an embodiment, the transmitting end device periodically sends an advertisement packet to the receiving end device, for example, the first advertisement packet and the second advertisement packet. The advertisement packet includes a quantity of link state advertisement packets that have been sent by the transmitting end device to the receiving end device when the transmitting end device sends the advertisement packet. A first time period may be a time interval between time points at which the transmitting end device sends two adjacent advertisement packets. A second time period is a time interval between time points at which the receiving end device receives the two adjacent advertisement packets. A first time period may be a time interval between time points at which the transmitting end device sends two non-adjacent advertisement packets. A second time period is a time interval between time points at which the receiving end device receives the two non-adjacent advertisement packets.

In an embodiment, the transmitting end device sends an advertisement packet at a specific moment, for example, sends the first advertisement packet to the receiving end device at a first moment. The transmitting end device sends the second advertisement packet to the receiving end device at a second moment.

In an embodiment, each of the first advertisement packet and the second advertisement packet is an OSPF packet, or each of the first advertisement packet and the second advertisement packet is an IS-IS packet. In an embodiment, each of the first advertisement packet and the second advertisement packet is an intermediate system to intermediate system hello (IS-IS Hello, IIH) packet, or each of the first advertisement packet and the second advertisement packet is an OSPF hello packet.

Figure 3A:
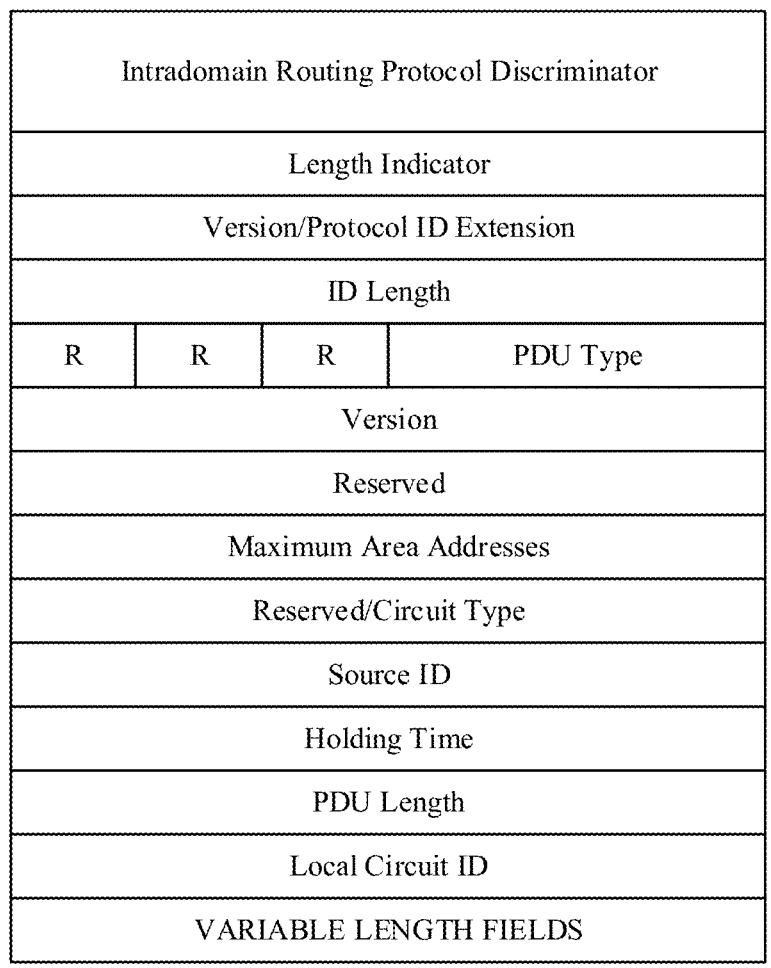
FIG. 3a is a schematic diagram of a format of an advertisement packet according to an embodiment of this application.

For a packet format of the IIH packet, refer to FIG. 3a. FIG. 3a is a schematic diagram of a format of an IIH packet. Meanings of various fields in the packet are described as follows:

Intradomain Routing Protocol Discriminator: indicates an intradomain routing selection protocol discriminator and may be set to 0x83.

Length Indicator: indicates a length of a protocol data unit (PDU) header.

Version/Protocol ID Extension: indicates version/protocol identifier extension.

ID Length: indicates a length of a system ID area. If a value of the ID length field is 0, it indicates that the length of the system ID area is 6 bytes. If a value of the ID length field is 255, it indicates that the system ID area is empty (that is, the length is 0).

R (Reserved): reserved and set to 0.

PDU Type: indicates a type of an IS-IS protocol PDU.

Version: version, set to 1 (0x01).

Maximum Area Address: indicates a maximum quantity of supported areas. If the maximum area address field is set to an integer ranging from 1 to 254, it indicates a maximum quantity of area addresses allowed by an IS-IS process. If the maximum area address field is set to 0, it indicates that an IS-IS process supports a maximum of three area addresses.

Reserved/Circuit Type: indicates that the six most significant bits are reserved and a value is 0. The two least significant bits indicate a router type.

Source ID: indicates a system ID of a router that sends an IS-IS hello packet.

Holding Time: indicates holding time. If no hello packet is received from a neighbor within the time, an established neighbor relationship is terminated.

PDU Length: indicates a total length of a PDU.

Local circuit ID: indicates an ID of an interface on the router that sends the IS-IS hello packet.

VARIABLE LENGTH FIELDS: indicate variable-length fields, and may be used to carry a newly added TLV.

Figure 3B:
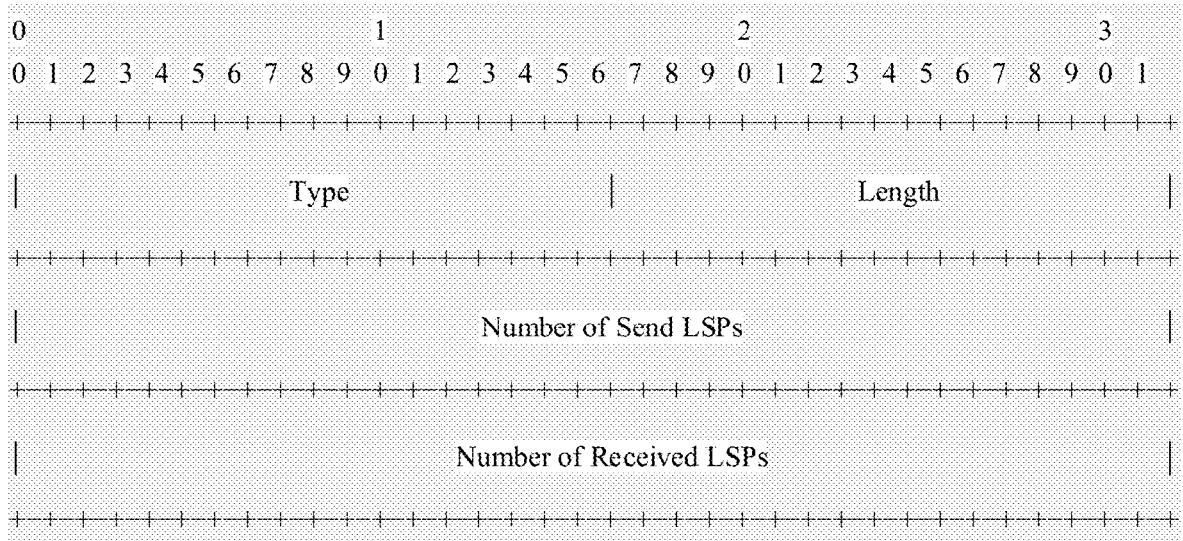
FIG. 3b is a schematic diagram of a format of an advertisement packet according to an embodiment of this application.

In this embodiment of this application, a TLV of quantities of received and sent IS-IS link state advertisement packets is newly added to the variable length fields of the IIH packet. FIG. 3b is a schematic diagram of a format of a TLV of quantities of received and sent IS-IS link state advertisement packets.

Type: identifies that a type of the TLV is a TLV of quantities of received and sent link state advertisement packets, and a value is a specific value.

Length: identifies a length of the TLV of quantities of received and sent IS-IS link state advertisement packets.

Number of Send LSPs: carries a quantity of LSPs sent by the transmitting end device, for example, the quantity a or the quantity c described above.

Number of Received LSPs: indicates a quantity of LSPs received by the transmitting end device, and records a quantity of LSPs received by the transmitting end from the receiving end. This field is optional.

In an embodiment, when a session or a neighbor relationship between a first network device and a second network device is re-established, values of the number of send LSPs field and the number of received LSPs field are reset.

Figure 4A:
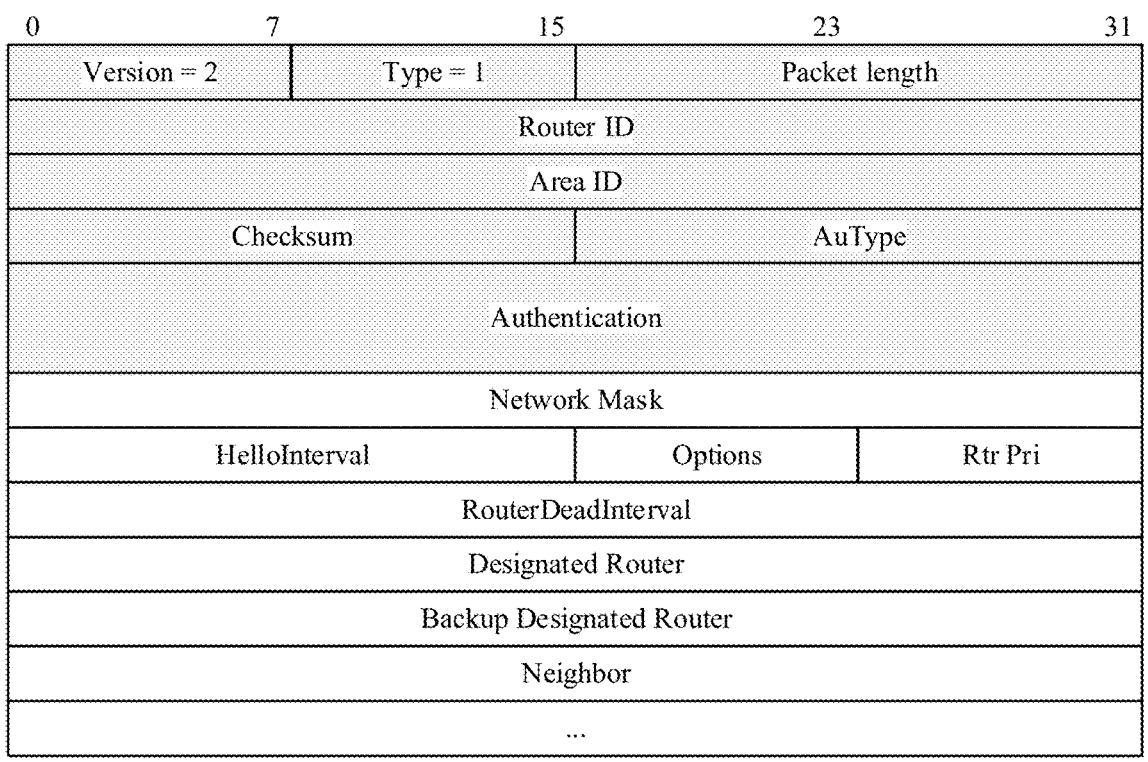
FIG. 4a is a schematic diagram of a format of an advertisement packet according to an embodiment of this application.

FIG. 4a is a schematic diagram of a format of an OSPF hello packet. Meanings of various fields in the packet are described as follows:

Version: indicates an OSPF version number. OSPFv2 has a value of 2.

Type: indicates a type field and a type of an OSPF packet, and identifies that the packet is an OSPF hello packet.

Packet length: indicates a total length of the OSPF packet.

Router ID: indicates an identifier of a router that sends the OSPF hello packet.

Area ID: indicates an area in which the OSPF hello packet is sent.

Checksum: indicates a checksum field, and includes a checksum of the entire packet except an authentication field.

AuType: indicates an authentication type.

Authentication: indicates an authentication field. When a type is 1, this field is password information. When a type is 2, this field includes information about a key ID, an MD5 authentication data length, and a sequence number.

Network Mask: indicates a mask of a network in which an interface for sending the OSPF hello packets is located.

HelloInterval: indicates a time interval at which the OSPF hello packet is sent.

Options: optional.

Rtr Pri: indicates a priority of a designated router (DR).

RouterDeadInterval: indicates dead time. If a hello packet from a neighbor is not received within the time, the neighbor becomes invalid.

Designated Router: indicates an interface address of the DR.

Backup Designated Router: indicates an interface address of a BDR.

Neighbor: indicates a neighbor identifier, and is identified by a router ID.

Figure 4B:
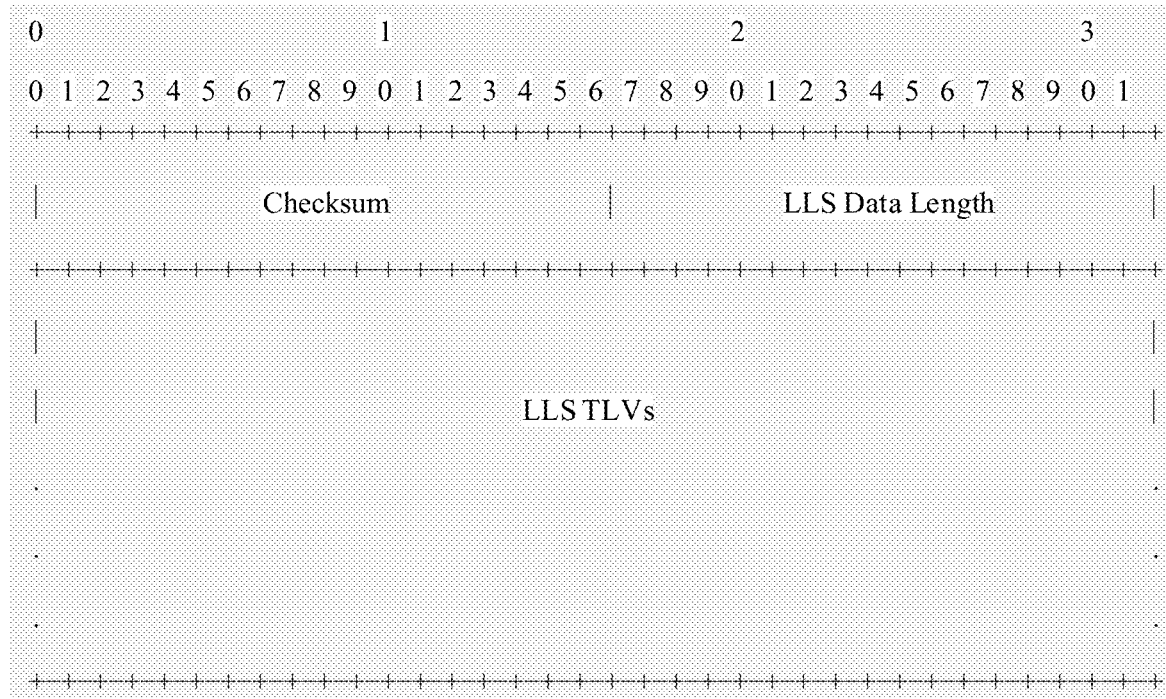
FIG. 4b is a schematic diagram of a format of an advertisement packet according to an embodiment of this application.

In this embodiment of this application, a flag bit is set in the options field of the OSPF hello shown in FIG. 4a. The flag bit indicates that the OSPF hello packet includes an LLS data block field, and the LLS data block field is carried behind the neighbor field in the OSPF hello packet. For a format of the LLS data block field, refer to FIG. 4b.

Checksum: indicates a checksum field, and is used for validity check.

LLS Data Length: identifies a length of the LLS data block field.

Figure 4C:
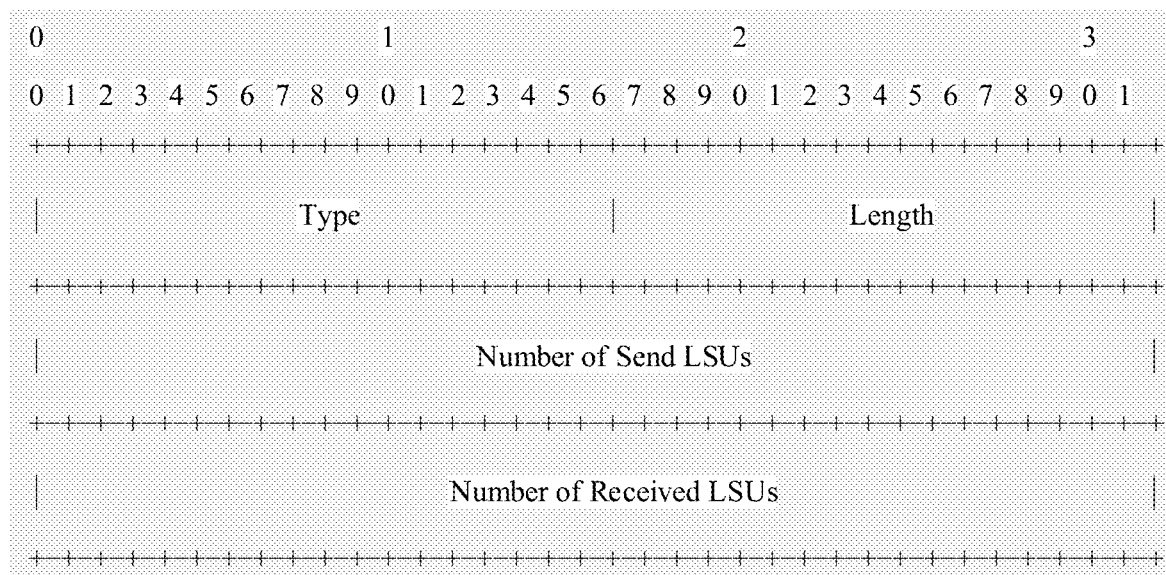
FIG. 4c is a schematic diagram of a format of an advertisement packet according to an embodiment of this application.

LLS TLVs: carries an extended TLV. The LLS TLVs include a TLV of quantities of received and sent OSPF link state advertisement packets, as shown in FIG. 4c.

Type: identifies the TLV of quantities of received and sent OSPF link state advertisement packets, and a value is a specific value.

Length: identifies a length of the TLV of quantities of received and sent IS-IS link state advertisement packets.

Number of Send LSUs: carries a quantity of LSU packets sent by the transmitting end device, for example, the quantity a or the quantity c described above.

Number of Received LSUs: indicates a quantity of LSU packets received by the transmitting end device, and records a quantity of LSPs received by the transmitting end from the receiving end. This field is optional.

In an embodiment, when the session or the neighbor relationship between the first network device and the second network device is re-established, values of the number of send LSUs field and the number of received LSUs field are reset.

S205: The receiving end device obtains a first quantity of link state advertisement packets sent by the transmitting end device to the receiving end device in the first time period. The first quantity is equal to a difference between the quantity c and the quantity a. The receiving end device obtains a second quantity of link state advertisement packets received from the transmitting end device in the second time period. The second quantity is equal to a difference between the quantity d and the quantity b.

In an embodiment, the first network device is connected to the second network device through a point-to-point interface. In this case, a link state advertisement packet sent by the second network device to the first network device is a unicast packet.

In an embodiment, the first network device is connected to a second interface of the second network device through a first interface, the first quantity is a quantity of link state advertisement packets sent by the second network device to the first network device through the second interface, and the second quantity is a quantity of link state advertisement packets received by the first network device from the second network device through the first interface.

S206: The receiving end device adjusts a link state advertisement packet receive window value of the receiving end device based on the first quantity and the second quantity.

In an embodiment, the quantity a and the quantity c are quantities, counted by a routing protocol processing module of the transmitting end device, of link state advertisement packets sent to the receiving end device. The quantity b and the quantity d are quantities, counted by the routing protocol processing module of the receiving end device, of link state advertisement packets received from the transmitting end device. The routing protocol processing module includes an OSPF module or an IS-IS module. If the first quantity is equal to the second quantity, it indicates that no protocol congestion or packet loss occurs. If the first quantity is not equal to the second quantity, it is considered that protocol congestion or a packet loss may occur. Whether the link state advertisement packet receive window value of the receiving end device needs to be adjusted depends on whether a difference between the first quantity and the second quantity exceeds a specific threshold.

The receiving end device adjusts the link state advertisement packet receive window value of the receiving end device based on the first quantity and the second quantity in one or more of the following manners:

Manner 1: When determining that the difference between the first quantity and the second quantity is greater than a threshold, the receiving end device decreases a default link state advertisement packet receive window value of the receiving end device by a first specific value, and uses the link state advertisement packet receive window value decreased by the first specific value as an adjusted link state advertisement packet receive window value. For example, if the default link state advertisement packet receive window value of the receiving end device is 100, and the threshold is 50, when determining that the difference between the first quantity and the second quantity is greater than or equal to 50, the receiving end device decreases the link state advertisement packet receive window value by the specific value 20, and the adjusted link state advertisement packet receive window value is 80.

Manner 2: When determining that the difference between the first quantity and the second quantity is less than or equal to a threshold, the receiving end device increases a default link state advertisement packet receive window value of the receiving end device by a second specific value, and uses the link state advertisement packet receive window value increased by the second specific value as an adjusted link state advertisement packet receive window value. For example, if the default link state advertisement packet receive window value of the receiving end device is 100, and the threshold is 50, when determining that the difference between the first quantity and the second quantity is less than 10, the receiving end device increases the receive window value by the specific value 20, and the adjusted receive window value is 120.

In an embodiment, a value of the threshold may be 0. When determining that the difference between the first quantity and the second quantity is greater than 0, the receiving end device adjusts the link state advertisement packet receive window value of the receiving end device. When the receiving end device determines that the difference between the first quantity and the second quantity is equal to 0, the receiving end device may not adjust the link state advertisement packet receive window value of the receiving end device, or may increase the link state advertisement packet receive window value of the receiving end device.

In an embodiment, the receiving end device sends the adjusted link state advertisement packet receive window value to the transmitting end device by using a fourth advertisement packet. The fourth advertisement packet may be an IS-IS hello packet or an OSPF hello packet, and the adjusted link state advertisement packet receive window value is carried in InterfaceLSPReceiveWindow sub-TLV of the fourth advertisement packet.

S207: The receiving end device sends the adjusted link state advertisement packet receive window value to the transmitting end device.

S208: The transmitting end device receives the adjusted link state advertisement packet receive window value from the receiving end device.

S209: The transmitting end device obtains the adjusted link state advertisement packet receive window value, and adjusts, based on the link state advertisement packet receive window value, a rate at which a link state advertisement packet is sent to the receiving device.

In an embodiment, the fourth advertisement packet further includes a default transmission time interval value of the link state advertisement packet.

In an embodiment, that the transmitting end adjusts, based on the link state advertisement packet receive window value, a rate at which a link state advertisement packet is sent to the receiving device includes:

The transmitting end device adjusts, based on the link state advertisement packet receive window value, a time interval at which the link state advertisement packet is sent to the receiving end device.

In an embodiment, that the transmitting end device adjusts, based on the link state advertisement packet receive window value, a time interval at which the link state advertisement packet is sent to the receiving end device includes:

When determining that a quantity of link state advertisement packets that are sent to the receiving end device and for which no response packet is received reaches the link state advertisement packet receive window value, the transmitting end device sets the time interval at which the transmitting end device sends the link state advertisement packet to the receiving end device to a specific value. The specific value is greater than a default transmission time interval at which the transmitting end device sends the link state advertisement packet to the receiving end device. To be specific, before the transmitting end device determines that the quantity of link state advertisement packets that are sent to the receiving end device and for which no response packet is received reaches the link state advertisement packet receive window value, the transmitting end device sends the link state advertisement packet to the receiving end device at the default transmission time interval. When the transmitting end device determines that the quantity of link state advertisement packets that are sent to the receiving end device and for which no response packet is received reaches the link state advertisement packet receive window value, the transmission time interval is increased. In this way, a quantity of link state advertisement packets sent by the transmitting end device to the receiving end device within unit time is reduced. When the time interval at which the transmitting end device sends the link state advertisement packet to the receiving end device is increased, it may also be considered that the transmitting end device enters a rate limiting mode.

According to the foregoing solution, when determining that the difference between the first quantity and the second quantity is greater than the specific threshold, the receiving end device determines that network congestion occurs, and the rate at which the transmitting end device sends the link state advertisement packet to the receiving end device needs to be limited. The link state advertisement packet receive window value of the receiving end device is decreased by the first specific value, so that the transmitting end device can enter the rate limiting mode as soon as possible. When determining that the difference between the first quantity and the second quantity is less than the specific threshold, the receiving end device determines that a network status is good and no congestion occurs. In this case, the rate at which the transmitting end device sends the link state advertisement packet to the receiving end device can be further increased. The link state advertisement packet receive window value of the receiving end device is increased by the second specific value, so that the transmitting end network device can avoid entering the rate limiting mode or enter the rate limiting mode more slowly. In this way, the rate at which the transmitting end device sends the link state advertisement packet to the receiving end device is also increased to some extent.

Figure 5:
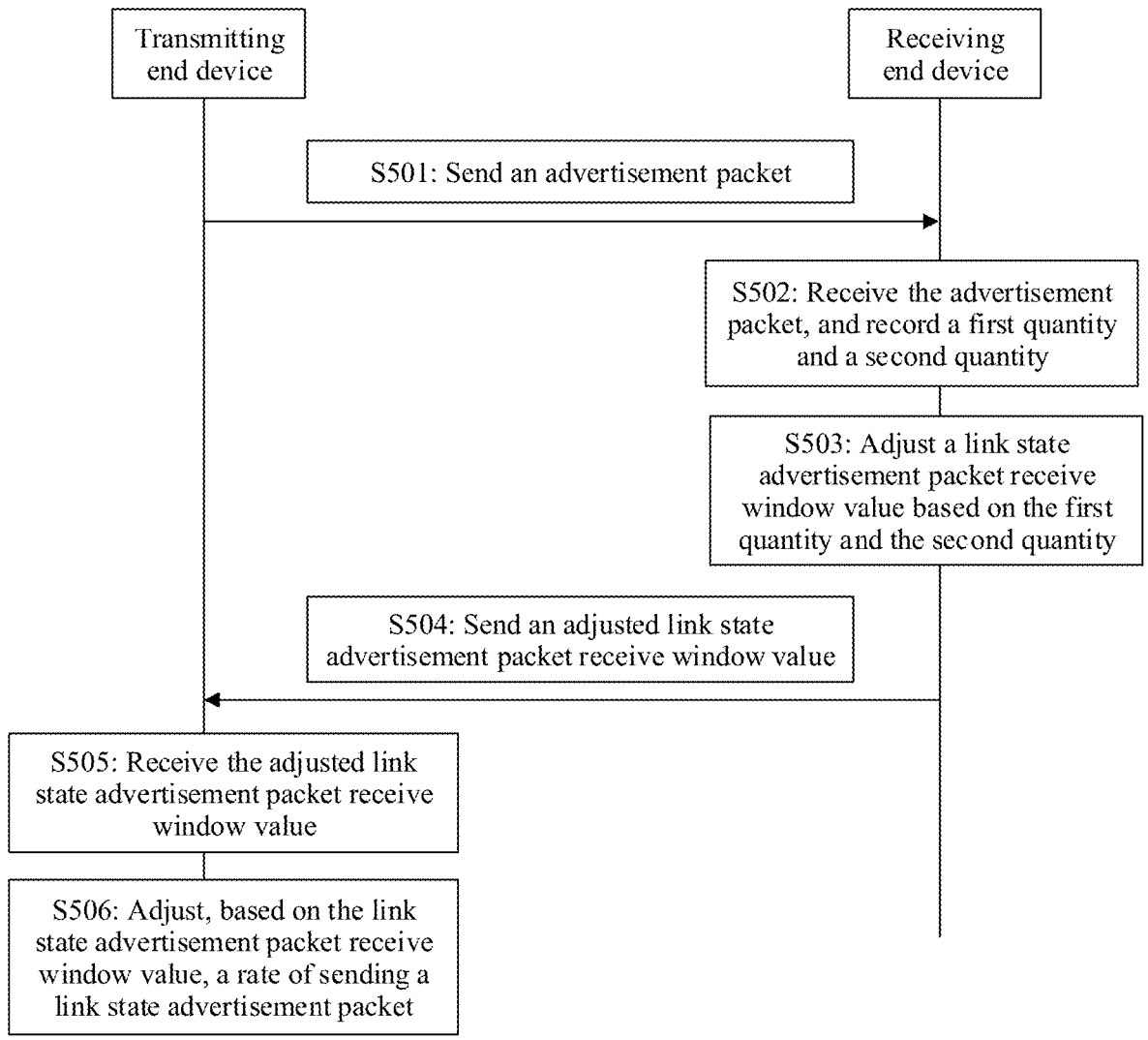
FIG. 5 is a schematic flowchart of a method for controlling packet sending according to an embodiment of this application.

Refer to FIG. 5. An embodiment of this application provides a method for controlling packet sending. The method includes the following operations.

S501: A transmitting end device sends an advertisement packet to a receiving end device, where the advertisement packet includes a first quantity of link state advertisement packets sent by the transmitting end device to the receiving end device in a first time period.

In this embodiment, the receiving end device may be the network device A in FIG. 1, and the transmitting end device is the network device B or the network device C in FIG. 1.

S502: The receiving end device obtains a second quantity of link state advertisement packets received from the transmitting end device in a second time period.

In an embodiment, the transmitting end device counts the quantity of link state advertisement packets sent to the receiving end device in the first time period, and then the transmitting end device sends the advertisement packet including the first quantity to the receiving end device. The first time period may be a fixed time period, for example, from 8 a.m. to 9 a.m., and correspondingly, the second time period is also from 8 a.m. to 9 a.m. In an embodiment, considering a delay in sending the link state advertisement packet by the transmitting end device to the receiving end device, start time and end time of the second time period may be later than those of the first time period. For example, when the first time period is from 8:00 a.m. to 9:00 a.m., the second time period may be from 8:01 a.m. to 9:01 a.m., and specific delayed time may be dynamically adjusted based on a measured delay in sending the link state advertisement packet by the transmitting end device to the receiving end device.

In an embodiment, the advertisement packet includes a start time point and an end time point of the first time period, and the receiving end device obtains the second quantity based on the start time point and the end time point of the first time period. For example, when the start time point included in the advertisement packet is 2 p.m., the end time point is 3 p.m., and the start time and the end time of the second time period may be 2 p.m. and 3 p.m. respectively, the receiving end device counts a quantity of link state advertisement packets received from the receiving end device between 2 p.m. and 3 p.m. In an embodiment, considering a delay in sending the link state advertisement packet by the transmitting end device to the receiving end device, the start time and the end time of the second time period may be later than the start time and the receiving time included in the advertisement packet. For example, when the start time point included in the advertisement packet is 2 p.m., and the end time point is 3 p.m., the start time point and the end time point of the second time period may be 2:01 p.m. and 3:01 p.m., and specific delayed time may be dynamically adjusted based on a measured delay in sending the link state advertisement packet by the transmitting end device to the receiving end device.

In this embodiment of this application, the advertisement packet may be an IIH packet or an OSPF hello packet. For a format of the IIH packet or the OSPF hello packet, refer to FIG. 3a and FIG. 4a. Details are not described herein again.

In an embodiment, the advertisement packet is an IIH packet. For a TLV of quantities of received and sent IS-IS link state advertisement packets included in the IIH packet, refer to FIG. 3b. In the embodiment shown in FIG. 5, Number of Send LSPs: carrying the first quantity of link state advertisement packets sent by the transmitting end device to the receiving end device in a first time period.

In an embodiment, the advertisement packet is an OSPF hello packet. For a TLV of quantities of received and sent OSPF link state advertisement packets included in the OSPF hello packet, refer to FIG. 4c. In the embodiment shown in FIG. 5, Number of Send LSUs: carrying the first quantity of link state advertisement packets sent by the transmitting end device to the receiving end device in the first time period.

S503: The receiving end device adjusts a link state advertisement packet receive window value of the receiving end device based on the first quantity and the second quantity. For a specific implementation of S503, refer to S206 in the embodiment shown in FIG. 2. Details are not described herein again.

S504: The receiving end device sends an adjusted link state advertisement packet receive window value to the transmitting end device. In an embodiment, the receiving end device sends the adjusted link state advertisement packet receive window value by using the fourth advertisement packet in the embodiment shown in FIG. 2.

S505: The transmitting end device receives the adjusted link state advertisement packet receive window value.

S506: The transmitting end device obtains the adjusted link state advertisement packet receive window value, and adjusts, based on the link state advertisement packet receive window value, a rate at which a link state advertisement packet is sent to the receiving device. For a specific implementation of S506, refer to S208 in the embodiment shown in FIG. 2. Details are not described herein again.

Figure 6:
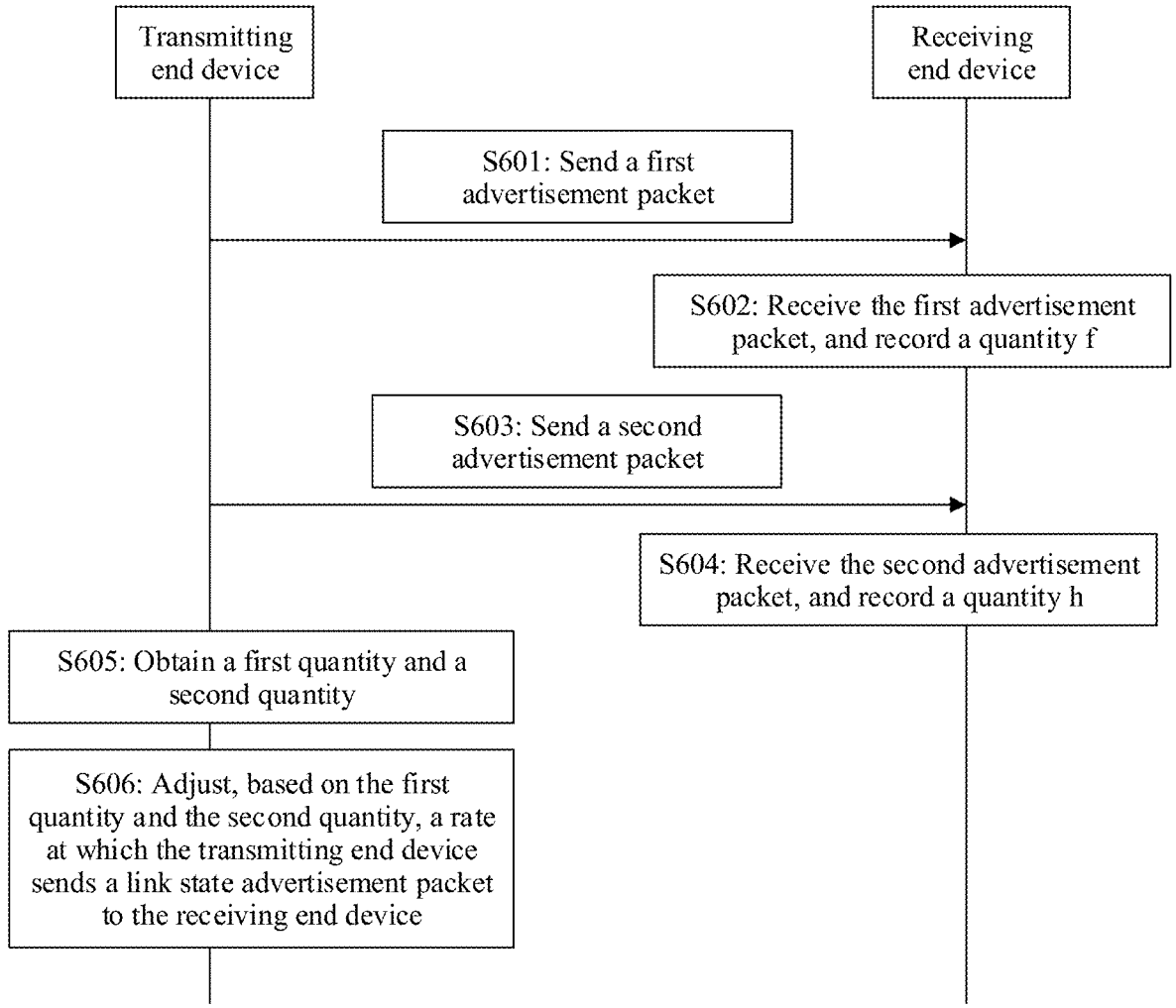
FIG. 6 is a schematic flowchart of a method for controlling packet sending according to an embodiment of this application.

Refer to FIG. 6. An embodiment of this application provides a method for controlling packet sending. The method includes the following operations.

S601: A transmitting end device sends a first advertisement packet to a receiving end device, and records a quantity e of link state advertisement packets that have been sent to the receiving end device when the first advertisement packet is sent. The first advertisement packet indicates the receiving end device to record, when receiving the first advertisement packet, a quantity of link state advertisement packets that have been received from the transmitting end. The receiving end device may be the network device A in FIG. 1, and the transmitting end device may be the network device B or the network device C in FIG. 1.

S602: The receiving end device receives the first advertisement packet, and records a quantity f, where the quantity f is a quantity of link state advertisement packets that have been received by the receiving end from the transmitting end when the first advertisement packet is received.

S603: The transmitting end device sends a second advertisement packet to the receiving end device, and records a quantity g of link state advertisement packets that have been sent to the receiving end device when the second advertisement packet is sent, where the second advertisement packet indicates the receiving end device to record, when receiving the second advertisement packet, a quantity of link state advertisement packets that have been received from the transmitting end.

S604: The receiving end device receives the second advertisement packet, and records a quantity h, where the quantity h is a quantity of link state advertisement packets that have been received by the receiving end from the transmitting end when the second advertisement packet is received.

S605: The transmitting end device obtains a first quantity, where the first quantity is a quantity of link state advertisement packets sent by the transmitting end device to the receiving end device in a first time period. The first quantity is a difference between the quantity g and the quantity e.

S606: The transmitting end device adjusts, based on the first quantity and a second quantity, a rate at which the transmitting end device sends a link state advertisement packet to the receiving end device, where the second quantity is a quantity of link state advertisement packets received by the receiving end device from the transmitting end device in a second time period.

In an embodiment, the receiving end device obtains the second quantity of link state advertisement packets received by the transmitting end device from the transmitting end device in the second time period. The second quantity is equal to a difference between the quantity h and the quantity f. The second time period is a time interval between time points at which the receiving end device receives the second advertisement packet and the first advertisement packet. The receiving end device sends a third advertisement packet to the transmitting end device, where the third advertisement packet includes the second quantity. The receiving end device receives the third advertisement packet, and adjusts, based on the second quantity and the first quantity, the rate at which the transmitting end device sends the link state advertisement packet to the receiving end device. In this embodiment of this application, the third advertisement packet is an IIH packet or an OSPF hello packet. For a format of the IIH packet, refer to FIG. 3a. For a format of the OSPF hello packet, refer to FIG. 4a. Details are not described herein again.

In an embodiment, the transmitting end device sends a fourth advertisement packet and a fifth advertisement packet to the receiving end device, where the fourth advertisement packet includes the quantity f, and the fifth advertisement packet includes the quantity h.

In an embodiment, the first advertisement packet and the second advertisement packet are IIH packets. For the format of the IIH packet, refer to FIG. 3a. Details are not described herein again. The IIH packet includes an indication identifier, and the indication identifier indicates the receiving end device to record, when receiving the first advertisement packet and/or the second advertisement packet, a quantity of link state advertisement packets that have been received from the transmitting end. In an embodiment, the indication identifier is carried in a Reserved field or VARIABLE LENGTH FIELDS in FIG. 3a.

In an embodiment, the first advertisement packet and the second advertisement packet are OSPF hello packets. For the format of the OSPF hello packet, refer to FIG. 4a. Details are not described herein again. The OSPF hello packet includes an indication identifier, and the indication identifier indicates the receiving end device to record, when receiving the first advertisement packet and/or the second advertisement packet, a quantity of link state advertisement packets that have been received from the transmitting end. In an embodiment, the indication identifier is carried in an Options field in FIG. 4a.

In an embodiment, the fourth advertisement packet and the fifth advertisement packet are IIH packets. For the format of the IIH packet, refer to FIG. 3a. Details are not described herein again. For a TLV of quantities of received and sent IS-IS link state advertisement packets included in the IIH packet, refer to FIG. 3b. In the embodiment shown in FIG. 6, Number of Received LSPs: carrying a quantity of link state advertisement packets received by the receiving end device from the transmitting end device, for example, the quantity f or the quantity h described above.

In an embodiment, the fourth advertisement packet and the fifth advertisement packet are OSPF hello packets. For the format of the OSPF hello packet, refer to FIG. 4a. Details are not described herein again. For a TLV of quantities of received and sent OSPF link state advertisement packets included in the OSPF hello packet, refer to FIG. 4c. In the embodiment shown in FIG. 6, Number of Received LSUs: carrying a quantity of link state advertisement packets received by the receiving end device from the transmitting end device, for example, the quantity f or the quantity h described above.

In an embodiment, the quantity e and the quantity g are quantities, counted by a routing protocol processing module of the transmitting end device, of link state advertisement packets sent to the receiving end device. The quantity f and the quantity h are quantities, counted by the routing protocol processing module of the receiving end device, of link state advertisement packets received from the transmitting end device. The routing protocol processing module includes an OSPF module or an IS-IS module. If the first quantity is equal to the second quantity, it indicates that no network congestion or packet loss occurs. If the first quantity is not equal to the second quantity, it is considered that network congestion or a protocol packet loss may occur. Whether the rate at which the link state advertisement packet is sent to the receiving end device needs to be adjusted depends on whether a difference between the first quantity and the second quantity exceeds a specific threshold.

In an embodiment, that the transmitting end device adjusts, based on the second quantity and the first quantity, the rate at which the transmitting end device sends the link state advertisement packet to the receiving end device includes:

adjusting, based on the second quantity and the first quantity, a time interval at which the transmitting end device sends the link state advertisement packet to the receiving end device.

In an embodiment, when determining that the difference between the second quantity and the first quantity is greater than the threshold, the transmitting end device increases, by a specific value, the time interval at which the transmitting end device sends the link state advertisement packet to the receiving end device. In this way, when the transmitting end device determines that a large quantity of link state advertisement packets are lost in a transmission process, a quantity of link state advertisement packets sent to the receiving end device within unit time may be decreased by increasing the time interval of sending the link state advertisement packet, to reduce pressure of processing the link state advertisement packet by the receiving end device, and avoid network congestion to some extent.

In an embodiment, when determining that the difference between the second quantity and the first quantity is less than or equal to the threshold, the transmitting end device decreases, by a specific value, the time interval at which the transmitting end device sends the link state advertisement packet to the receiving end device. In this way, when it is determined that no network congestion occurs in a process of transmitting the link state advertisement packet, a quantity of link state advertisement packets sent to the receiving end device within unit time may be increased by decreasing the time interval of sending the link state advertisement packet, so that the receiving end device can process the link state advertisement packet more quickly, to improve utilization of network resources to some extent.

In an embodiment, the adjusting, based on the second quantity and the first quantity, the rate at which the transmitting end device sends the link state advertisement packet to the receiving end device includes:

adjusting, based on the second quantity and the first quantity, a link state advertisement packet receive window value corresponding to the receiving end device.

In an embodiment, when it is determined that the difference between the first quantity and the second quantity is greater than the threshold, the link state advertisement packet receive window value corresponding to the receiving end device is decreased by a first specific value. The link state advertisement packet receive window value decreased by the first specific value is used as an adjusted link state advertisement packet receive window value. A packet is forwarded based on the adjusted link state advertisement packet receive window value. The link state advertisement packet receive window value is decreased by the first specific value, so that the transmitting end device can enter a rate limiting mode as soon as possible.

In an embodiment, when it is determined that the difference between the first quantity and the second quantity is less than or equal to the threshold, the link state advertisement packet receive window value corresponding to the receiving end device is increased by a specific value. A default link state advertisement packet receive window value of the receiving end device is increased by a second specific value, and the link state advertisement packet receive window value increased by the second specific value is used as an adjusted link state advertisement packet receive window value. A packet is forwarded based on the adjusted link state advertisement packet receive window value. When determining that the difference between the first quantity and the second quantity is less than or equal to the specific threshold, the transmitting end device determines that a network status is good and no congestion occurs. In this case, the rate at which the link state advertisement packet is sent to the receiving end device can be further increased. The link state advertisement packet receive window value of the receiving end device is increased by the second specific value, so that the transmitting end device can avoid entering the rate limiting mode or enter the rate limiting mode later. In this way, the rate at which the transmitting end device sends the link state advertisement packet to the receiving end device is also increased to some extent.

Figure 7:
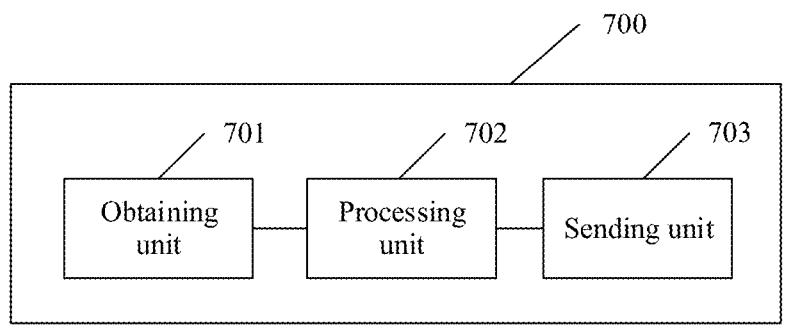
FIG. 7 is a schematic diagram of a structure of a network device according to an embodiment of this application.

FIG. 7 is a possible schematic diagram of a structure of the network device in the foregoing embodiments. The network device 700 may implement a function of the receiving end device in the embodiment shown in FIG. 2 or FIG. 5. Refer to FIG. 7. The network device 700 includes an obtaining unit 701, a processing unit 702, and a sending unit 703. These units may perform corresponding functions of the receiving end device in the foregoing method examples. The obtaining unit 701 is configured to support the network device 700 in performing S202, S204, and S205 in FIG. 2, or is configured to support the network device 700 in performing S502 in FIG. 5. The processing unit 702 is configured to support the network device 700 in performing S206 in FIG. 2, or is configured to support the network device 700 in performing S503 in FIG. 5, and/or another process performed by the receiving end device in the technology described in this specification. The sending unit 703 is configured to support the network device 700 in performing S207 in FIG. 2, or is configured to support the network device 700 in performing S504 in FIG. 5. For example, the processing unit 702 is configured to perform various processing operations performed by the receiving end device in the foregoing method embodiments; and the sending unit 703 is configured to perform an operation of sending a packet by the transmitting end device in the foregoing method embodiments. For example, the obtaining unit 701 is configured to: obtain a first quantity of link state advertisement packets sent by the transmitting end device to the network device 700 in a first time period, and obtain a second quantity of link state advertisement packets received from the transmitting end device in a second time period. The processing unit 702 is configured to adjust a link state advertisement packet receive window value of the network device 700 based on the first quantity and the second quantity. The sending unit 703 is configured to send an adjusted link state advertisement packet receive window value to the transmitting end device. For a specific execution process, refer to detailed descriptions of corresponding operations in the embodiment shown in FIG. 2 or FIG. 5. Details are not described herein again.

Figure 8:
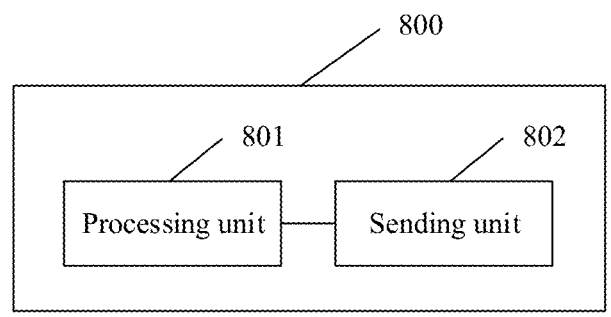
FIG. 8 is a schematic diagram of a structure of a network device according to an embodiment of this application.

FIG. 8 is a possible schematic diagram of a structure of the network device in the foregoing embodiments. The network device 800 may implement a function of the transmitting end device in the embodiment shown in FIG. 2 or FIG. 5. Refer to FIG. 8. The network device 800 includes a receiving unit 801 and a processing unit 802. These units may perform corresponding functions of the transmitting end device in the foregoing method examples. The receiving unit 801 is configured to support the network device 800 in performing S208 in FIG. 2, or support the network device 800 in performing S505 in FIG. 5. The processing unit 802 is configured to support the network device 700 in performing S209 in FIG. 2, or support the network device 800 in performing S506 in FIG. 5, and/or another process performed by the transmitting end device in the technology described in this specification. For example, the receiving unit 801 is configured to perform a packet receiving operation performed by the transmitting end device in the foregoing method embodiments; and the processing unit 802 is configured to perform various processing operations performed by the transmitting end device in the foregoing method embodiments. For example, the receiving unit 801 is configured to receive a link state advertisement packet receive window value of the receiving end device sent by the receiving end device, where the link state advertisement packet receive window value of the receiving end device is a link state advertisement packet receive window value adjusted by the receiving end device based on a first quantity and a second quantity, the first quantity is a quantity of link state advertisement packets sent by the network device 800 to the receiving end device in a first time period, and the second quantity is a quantity of link state advertisement packets received by the receiving end device from the network device 800 in a second time period. The processing unit 802 is configured to adjust, based on the link state advertisement packet receive window value of the receiving end device, a rate at which a link state advertisement packet is sent to the receiving end device. For a specific execution process, refer to detailed descriptions of corresponding operations in the embodiment shown in FIG. 2 or FIG. 5. Details are not described herein again.

Figure 9:
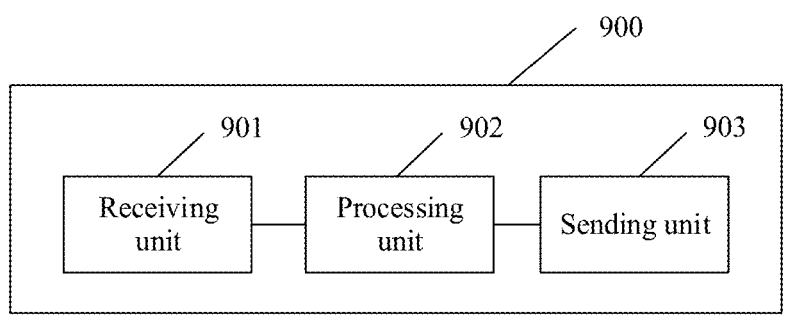
FIG. 9 is a schematic diagram of a structure of a network device according to an embodiment of this application.

FIG. 9 is a possible schematic diagram of a structure of the network device in the foregoing embodiments. The network device 900 may implement a function of the receiving end device in the embodiment shown in FIG. 6. Refer to FIG. 9. The network device 900 includes a receiving unit 901, a processing unit 902, and a sending unit 903. These units may perform corresponding functions of the receiving end device in the foregoing method examples. The receiving unit 901 is configured to support the network device 900 in performing operations S602 and S604 in FIG. 6. The processing unit 902 is configured to support the network device 900 in performing operations S602 and S604 in FIG. 6. For example, the receiving unit 901 is configured to perform various receiving operations performed by the receiving end device in the foregoing method embodiments. The processing unit 902 is configured to perform various processing operations performed by the receiving end device in the foregoing method embodiments, and/or another process performed by the receiving end device in the technology described in this specification. The sending unit 1002 is configured to perform various sending operations performed by the receiving end device in the foregoing method embodiments. For example, the receiving unit 901 is configured to receive a first advertisement packet and a second advertisement packet. The processing unit 902 is configured to record a quantity f and a quantity h. The sending unit 1002 is configured to send a second quantity to the transmitting end device. For a specific execution process, refer to detailed descriptions of corresponding operations in the embodiment shown in FIG. 6. Details are not described herein again.

Figure 10:
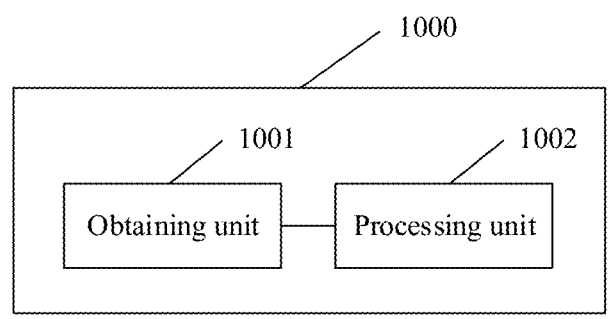
FIG. 10 is a schematic diagram of a structure of a network device according to an embodiment of this application.

FIG. 10 is a possible schematic diagram of a structure of the network device in the foregoing embodiments. The network device 1000 may implement a function of the transmitting end device in the embodiment shown in FIG. 6. Refer to FIG. 10. The network device 1000 includes an obtaining unit 1001 and a processing unit 1002. These units may perform corresponding functions of the transmitting end device in the foregoing method examples. The obtaining unit 1001 is configured to support the network device 1000 in performing operation S605 in FIG. 6. The processing unit 1002 is configured to support the network device 1000 in performing operation S606 in FIG. 6, and/or another process performed by the transmitting end device in the technology described in this specification. For example, the obtaining unit 1001 is configured to perform a packet receiving operation performed by the transmitting end device in the foregoing method embodiments; and the processing unit 1002 is configured to perform various processing operations performed by the transmitting end device in the foregoing method embodiments. For example, the obtaining unit 1001 is configured to obtain a second quantity of link state advertisement packets received by a receiving end device from the network device 1000 in a second time period. The processing unit 1002 is configured to adjust, based on the second quantity and a first quantity, a rate at which the network device 1000 sends a link state advertisement packet to the receiving end device, where the first quantity is a quantity of link state advertisement packets sent by the network device 1000 to the receiving end device in a first time period. For a specific execution process, refer to detailed descriptions of corresponding operations in the embodiment shown in FIG. 6. Details are not described herein again.

It should be noted that, in this embodiment of this application, division into the units is an example, and is merely logical function division. During actual implementation, another division manner may be used. Functional units in this embodiment of this application may be integrated into one processing unit, or each of the units may exist alone physically, or two or more units are integrated into one unit. For example, in the foregoing embodiment, the processing unit and the sending unit may be a same unit or different units. The integrated unit may be implemented in a form of hardware, or may be implemented in a form of a software functional unit.

Figure 11:
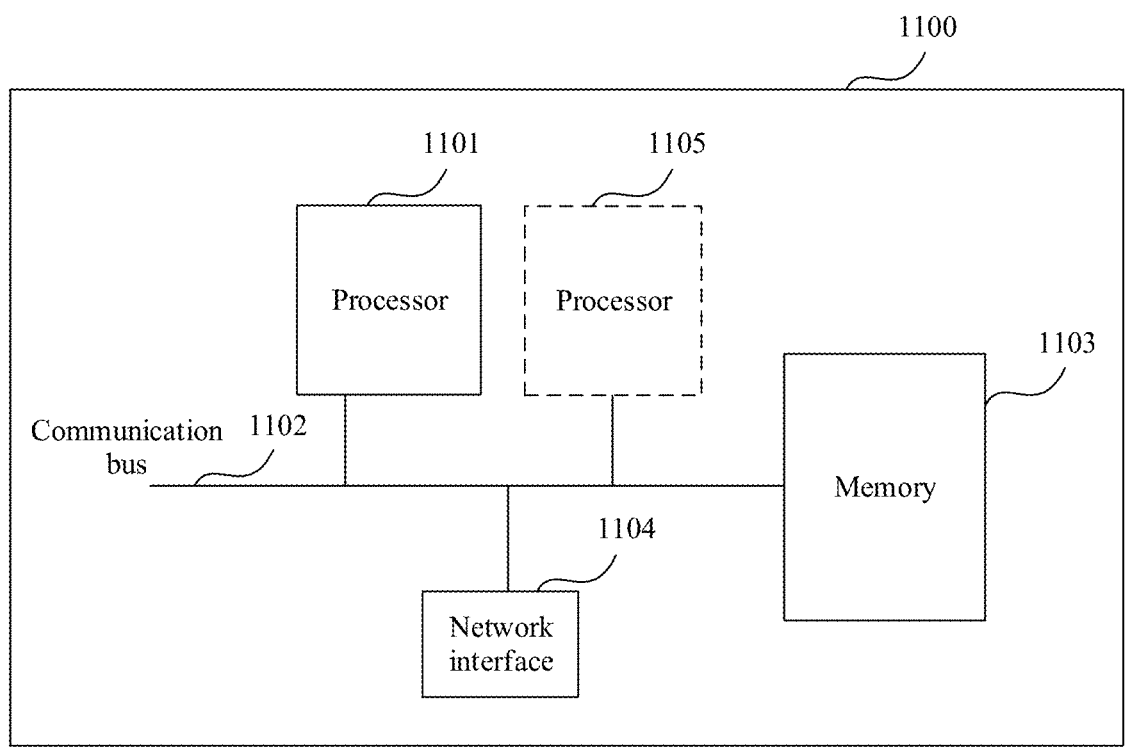
FIG. 11 is a schematic diagram of a structure of a network device according to an embodiment of this application.

FIG. 11 is a schematic diagram of a structure of a device 1100 according to an embodiment of this application. The transmitting end device or the receiving end device in the embodiment shown in FIG. 2, FIG. 5, or FIG. 6 may be implemented as the device shown in FIG. 11. Refer to FIG. 11. The device 1100 includes at least one processor 1101, a communication bus 1102, and at least one network interface 1104. In an embodiment, the device 1100 may further include a memory 1103.

The processor 1101 may be a general-purpose central processing unit (CPU), an application-specific integrated circuit (ASIC), or one or more integrated circuits (ICs) for controlling program execution of the solutions of this application. The processor may be configured to process a received packet, to implement the packet processing method provided in embodiments of this application.

For example, when the receiving end device in the embodiment shown in FIG. 2 is implemented as the device shown in FIG. 11, the network interface 1104 is configured to receive a first advertisement packet and a second advertisement packet that are sent by the transmitting end device. The processor 1101 may be configured to adjust a link state advertisement packet receive window value of the device 100 based on the first quantity and the second quantity. The network interface 1104 is further configured to send an adjusted link state advertisement packet receive window value to the transmitting end device. For a specific function implementation, refer to the processing part of the corresponding network device in the method embodiments. For another example, when the transmitting end device in the embodiment shown in FIG. 2 is implemented as the device shown in FIG. 11, the network interface 1104 is configured to: send a first advertisement packet and a second advertisement packet to the receiving end device, and receive a link state advertisement packet receive window value of the receiving end device adjusted by the receiving end device based on a first quantity. The processor 1103 may be configured to adjust, based on the link state advertisement packet receive window value of the receiving end device, a time interval at which a link state advertisement packet is sent to the receiving end device.

The communication bus 1102 is configured to transmit information between the processor 1101, the network interface 1104, and the memory 1103.

The memory 1103 may be a read-only memory (ROM) or another type of static storage device that may store static information and instructions. The memory 1103 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and that can be accessed by a computer. However, the memory is not limited thereto. The memory 1103 may exist independently, and is connected to the processor 1101 by using the communication bus 1102. The memory 1103 may alternatively be integrated with the processor 1101.

In an embodiment, the memory 1103 is configured to store program code or instructions for executing the solutions of this application, and the processor 1101 controls the execution. The processor 1101 is configured to execute the program code or the instructions stored in the memory 1103. The program code may include one or more software modules. In an embodiment, the processor 1101 may alternatively store the program code or the instructions for executing the solutions of this application. In this case, the processor 1101 does not need to read the program code or the instructions from the memory 1103.

The network interface 1104 may be an apparatus such as a transceiver, and is configured to communicate with another device or a communication network. The communication network may be the Ethernet, a radio access network (RAN), a wireless local area network (WLAN), or the like. The network interface 1104 may be an Ethernet interface, a fast Ethernet (FE) interface, a gigabit Ethernet (GE) interface, or the like.

In an embodiment, the device 1100 may include a plurality of processors, for example, the processor 1101 and a processor 1105 shown in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

Figure 12:
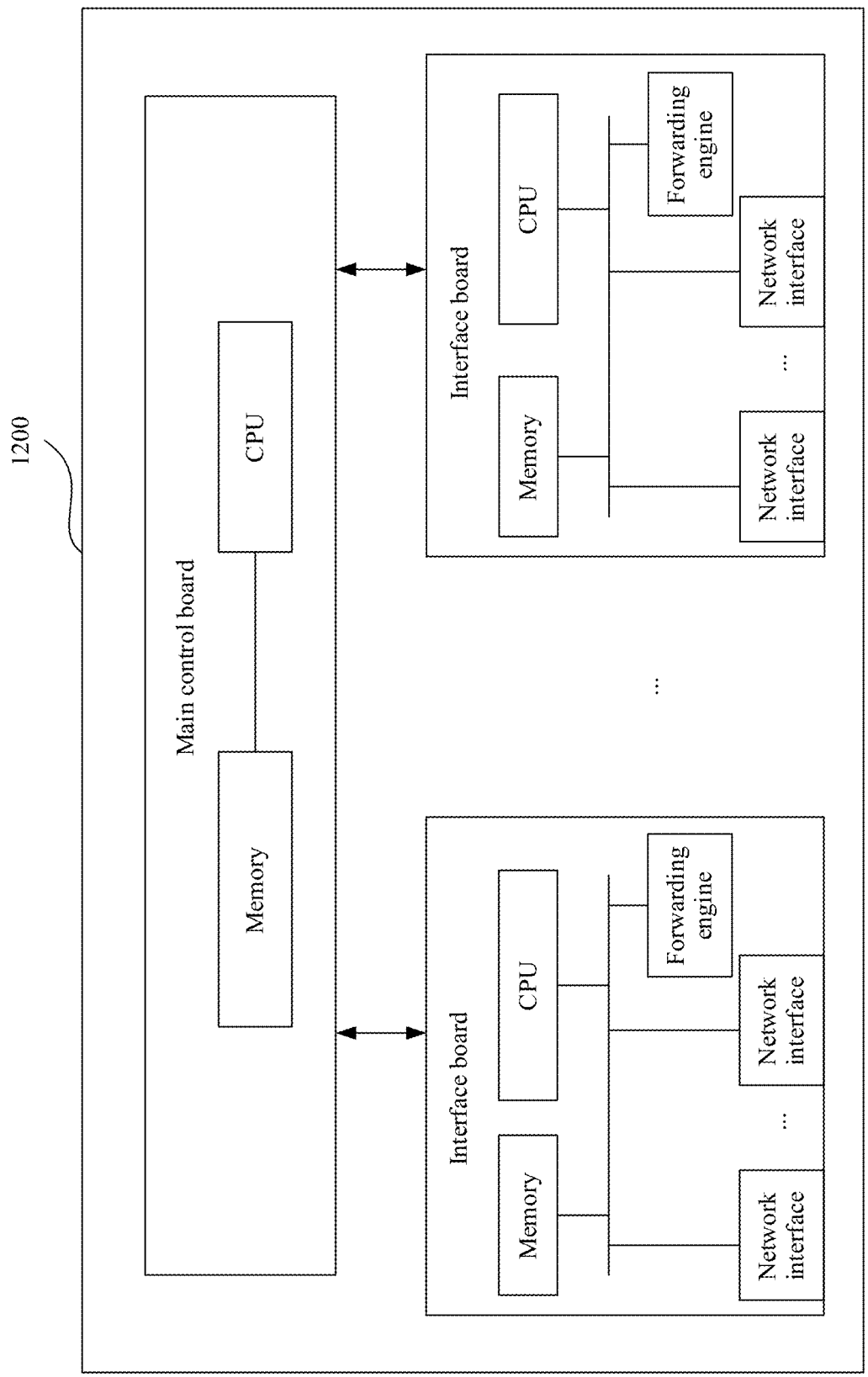
FIG. 12 is a schematic diagram of a structure of a network device according to an embodiment of this application.

FIG. 12 is a schematic diagram of a structure of a device 1200 according to an embodiment of this application. The transmitting end device and the receiving end device in the embodiment shown in FIG. 2, FIG. 5, or FIG. 6 may be implemented as the device shown in FIG. 12. Correspondingly, the device 1200 may implement a function performed by the transmitting end device and the receiving end device in the embodiment shown in FIG. 2, FIG. 5, or FIG. 6. Refer to the schematic diagram of the structure of the device shown in FIG. 12. The device 1200 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 1200, including route computation, and device management and maintenance functions. The interface board is also referred to as a line processing unit (line processing unit, LPU) or a line card, and is configured to receive and send a packet. In some embodiments, the main control board communicates with the interface board through a bus, or the interface boards communicate with each other through a bus. In some embodiments, the interface boards communicate with each other through a switching board. In this case, the device 1200 also includes a switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding table stored in the memory. If a destination address of the received packet is an Internet protocol (IP) address of the device 1200, the forwarding engine sends the packet to the CPU of the main control board or the CPU of the interface board for processing. If a destination address of the received packet is not an IP address of the device 1200, the forwarding engine searches the forwarding table based on the destination address. If a next hop and an outbound interface that correspond to the destination address are found from the forwarding table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform a function of the forwarding engine, for example, implementing software forwarding based on a general-purpose CPU, so that no forwarding engine is required in the interface board. In some embodiments, the forwarding engine may be implemented as an application-specific integrated circuit (ASIC) or a field programmable gate array (FPGA). In some embodiments, the memory that stores the forwarding table may alternatively be integrated in the forwarding engine, and is used as a part of the forwarding engine.

Figure 13:
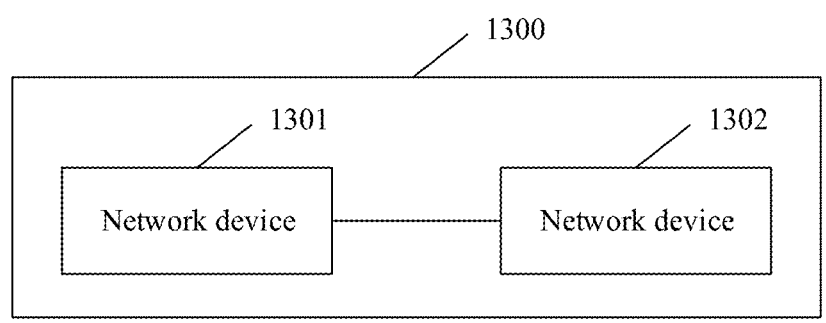
FIG. 13 is a schematic diagram of a network system for controlling packet sending according to an embodiment of this application.

Refer to FIG. 13. An embodiment of the present disclosure provides a system 1300 for controlling packet sending. The system 1300 is configured to implement the method for controlling packet sending in the foregoing method embodiments. The system 1300 includes a network device 1301 and a network device 1302. The network device 1301 may implement a function of the transmitting end device in the embodiment shown in FIG. 2, FIG. 5, or FIG. 6, and the network device 1302 may implement a function of the receiving end device in the embodiment shown in FIG. 2, FIG. 5, or FIG. 6. For example, when the system 1300 is configured to implement the method in the embodiment shown in FIG. 2, the network device 1302 is configured to obtain a first quantity of link state advertisement packets sent by the network device 1301 to the network device 1302 in a first time period. The network device 1302 obtains a second quantity of link state advertisement packets received from the network device 1301 in a second time period. The network device 1302 adjusts a link state advertisement packet receive window value of the network device 1302 based on the first quantity and the second quantity. The network device 1302 sends an adjusted link state advertisement packet receive window value to the network device 1301. The network device 1301 is configured to receive the link state advertisement packet receive window value of the network device 1302 sent by the network device 1302. The network device 1301 adjusts, based on the link state advertisement packet receive window value of the network device 1302, a rate at which a link state advertisement packet is sent to the network device 1302. For a specific execution process of the system 1300, refer to detailed descriptions of corresponding operations in the embodiment shown in FIG. 2, FIG. 5, or FIG. 6. Details are not described herein again.

An embodiment of the present disclosure further provides a computer-readable storage medium, configured to store software instructions used in the foregoing embodiments. The software instructions include a program used to perform the methods shown in the foregoing embodiments. When the program is executed on a computer or a device, the computer or the device is enabled to perform the methods in the foregoing method embodiments.

An embodiment of this application further provides a chip system, including a processor. The processor is coupled to a memory, and the memory is configured to store a program or instructions. When the program or the instructions are executed by the processor, the chip system is enabled to implement the method of the first network device or the second network device in the embodiment shown FIG. 5.

In an embodiment, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

In an embodiment, there may also be one or more memories in the chip system. The memory may be integrated with the processor, or may be disposed separately from the processor. This is not limited in this application. For example, the memory may be a non-transitory memory, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processor (DSP), a micro controller unit (MCU), a programmable logic device (PLD), or another integrated chip.

It should be understood that the operations in the foregoing method embodiments may be completed by using a hardware integrated logic circuit or instructions in a form of software in the processor. The operations of the methods disclosed with reference to embodiments of this application may be directly performed by a hardware processor, or may be performed by a combination of hardware in the processor and a software module.

In the specification, claims, and accompanying drawings of this application, the terms "first", "second", "third", "fourth", and the like are intended to distinguish between similar objects but do not need to be used to describe a specific order or sequence. It should be understood that the data termed in such a way is interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

In this application, "at least one item (piece)" means one or more, and "a plurality of" means two or more. "At least one item (piece) of the following" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the operations of the methods described in embodiments of this application. The storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in the present disclosure may be implemented by using hardware, software, firmware, or any combination thereof. When the functions are implemented by using the software, the foregoing functions may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any usable medium accessible to a general-purpose computer or a dedicated computer.

The objectives, technical solutions, and beneficial effects of the present disclosure are further described in detail in the foregoing specific implementations. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for controlling packet sending, comprising:
    obtaining, by a first network device, a first quantity of link state advertisement packets sent by a second network device to the first network device in a first time period;
    obtaining, by the first network device, a second quantity of link state advertisement packets received from the second network device in a second time period corresponding to the first time period;
    adjusting, by the first network device, a link state advertisement packet receive window value of the first network device based on the first quantity and the second quantity; and sending, by the first network device, an adjusted link state advertisement packet receive window value to the second network device, wherein obtaining the first quantity of link state advertisement packets sent by the second network device to the first network device in the first time period comprises:

receiving, by the first network device, a third advertisement packet sent by the second network device, wherein the third advertisement packet comprises the first quantity.

2. The method according to claim 1, wherein obtaining the first quantity of link state advertisement packets sent by the second network device to the first network device in the first time period comprises:

receiving, by the first network device, a first advertisement packet sent by the second network device, wherein the first advertisement packet comprises a third quantity of link state advertisement packets that have been sent by the second network device to the first network device when the first advertisement packet is sent;

receiving, by the first network device, a second advertisement packet sent by the second network device, wherein the second advertisement packet comprises a fourth quantity of link state advertisement packets that have been sent by the second network device to the first network device when the second advertisement packet is sent; and obtaining, by the first network device, the first quantity of link state advertisement packets, wherein the first quantity of link state advertisement packets is equal to a difference between the fourth quantity and the third quantity.

3. The method according to claim 2, wherein obtaining the second quantity of link state advertisement packets received from the second network device in the second time period comprises:

obtaining, by the first network device, a fifth quantity of link state advertisement packets that have been received from the second network device when the first advertisement packet is received; and obtaining, by the first network device, a sixth quantity of link state advertisement packets that have been received from the second network device when the second advertisement packet is received, wherein the second quantity is equal to a difference between the sixth quantity and the fifth quantity.

4. The method according to claim 1, wherein the third advertisement packet further comprises a start time point of the first time period and an end time point of the first time period, and obtaining the second quantity of link state advertisement packets received from the second network device in the second time period corresponding to the first time period comprises:

obtaining, by the first network device, the second quantity of link state advertisement packets based on the start time point of the first time period and the end time point of the first time period.

5. The method according to claim 1, wherein adjusting the link state advertisement packet receive window value of the first network device comprises:

when determining that a difference between the first quantity and the second quantity is greater than a threshold, decreasing the link state advertisement packet receive window value of the first network device by a specific value, wherein the adjusted link state advertisement packet receive window value is the decreased link state advertisement packet receive window value of the first network device.

6. The method according to claim 1, wherein adjusting the link state advertisement packet receive window value of the first network device comprises:

when determining that a difference between the first quantity and the second quantity is less than or equal to a threshold, increasing the link state advertisement packet receive window value of the first network device by a specific value, wherein the adjusted link state advertisement packet receive window value is the increased link state advertisement packet receive window value of the first network device.

7. The method according to claim 1, wherein the second quantity is a quantity, counted by the first network device, of link state advertisement packets received from the second network device.

8. The method according to claim 1, wherein the first quantity is a quantity, counted by the second network device, of link state advertisement packets sent to the first network device.

9. The method according to claim 7, wherein the quantity of link state advertisement packets are counted by the first network device through an open shortest path first (OSPF) protocol or an intermediate system to intermediate system (IS-IS) protocol.

10. The method according to claim 2, wherein each of the first advertisement packet and the second advertisement packet is an OSPF packet, or each of the first advertisement packet and the second advertisement packet is an IS-IS packet.

11. A method for controlling packet sending, comprising:

receiving, by a second network device, a link state advertisement packet receive window value of a first network device sent by the first network device, wherein the link state advertisement packet receive window value of the first network device is a link state advertisement packet receive window value adjusted by the first network device based on a first quantity and a second quantity, the first quantity is a quantity of link state advertisement packets sent by the second network device to the first network device in a first time period, the second quantity is a quantity of link state advertisement packets received by the first network device from the second network device in a second time period, and the second time period corresponds to the first time period; and adjusting, by the second network device based on the link state advertisement packet receive window value of the first network device, a rate at which a link state advertisement packet is sent to the first network device.

12. The method according to claim 11, wherein the method further comprises:

sending, by the second network device, a first advertisement packet to the first network device, wherein the first advertisement packet comprises a third quantity of link state advertisement packets that have been sent by the second network device to the first network device when the first advertisement packet is sent; and sending, by the second network device, a second advertisement packet to the first network device, wherein the second advertisement packet comprises a fourth quantity of link state advertisement packets that have been sent by the second network device to the first network device when the second advertisement packet is sent, and the first quantity is equal to a difference between the fourth quantity and the third quantity.

13. The method according to claim 11, wherein the method further comprises:
sending, by the second network device, a third advertisement packet to the first network device, wherein the third advertisement packet comprises the first quantity.

14. The method according to claim 11, wherein adjusting the rate at which the link state advertisement packet is sent to the first network device comprises:
adjusting, by the second network device based on the link state advertisement packet receive window value, a time interval during which the link state advertisement packet is sent to the first network device.

15. A first network device for controlling packet sending, the first network device comprising:
at least one non-transitory memory storage comprising instructions; and
one or more processors in communication with the memory storage, wherein the instructions, when executed by the one or more processors, cause the first network device to: obtain a first quantity of link state advertisement packets sent by a second network device to the first network device in a first time period, and obtain a second quantity of link state advertisement packets received from the second network device in a second time period corresponding to the first time period;
adjust a link state advertisement packet receive window value of the first network device based on the first quantity and the second quantity; and
send an adjusted link state advertisement packet receive window value to the second network device,
wherein obtaining the first quantity of link state advertisement packets sent by the second network device to the first network device in the first time period comprises:
receiving, by the first network device, a third advertisement packet sent by the second network device, wherein the third advertisement packet comprises the first quantity.

16. The first network device according to claim 15, wherein the instructions, when executed by the one or more processors, cause the first network device to:
when determining that a difference between the first quantity and the second quantity is greater than a threshold, decrease the link state advertisement packet receive window value of the first network device by a specific value, wherein the adjusted link state advertisement packet receive window value is the decreased link state advertisement packet receive window value.

17. The first network device according to claim 15, wherein the instructions, when executed by the one or more processors, cause the first network device to:
when determining that a difference between the first quantity and the second quantity is less than or equal to a threshold, increase the link state advertisement packet receive window value of the first network device by a specific value, wherein the adjusted link state advertisement packet receive window value is the increased link state advertisement packet receive window value.

18. A second network device for controlling packet sending, the second network device comprising:
at least one non-transitory memory storage comprising instructions; and
one or more processors in communication with the memory storage, wherein the instructions, when executed by the one or more processors, cause the second network device to:
receive a link state advertisement packet receive window value of a first network device sent by the first network device, wherein the link state advertisement packet receive window value of the first network device is a link state advertisement packet receive window value adjusted by the first network device based on a first quantity and a second quantity, the first quantity is a quantity of link state advertisement packets sent by the second network device to the first network device in a first time period, the second quantity is a quantity of link state advertisement packets received by the first network device from the second network device in a second time period, and the second time period corresponds to the first time period; and
adjust, based on the link state advertisement packet receive window value of the first network device, a rate at which a link state advertisement packet is sent to the first network device.

19. The second network device according to claim 18, wherein the instructions, when executed by the one or more processors, cause the first network device to:
when determining that a quantity of link state advertisement packets that are sent to the first network device and for which no response packet is received reaches the link state advertisement packet receive window value, adjust a time interval during which the second network device sends the link state advertisement packet to the first network device to a specific value.

* * * * *